US012613225B2

(12) United States Patent
Al Brahim et al.

(10) Patent No.: US 12,613,225 B2
(45) Date of Patent: Apr. 28, 2026

(54) MOTORIZED CUFFING MECHANISM FOR ULTRASOUND INSPECTION

(71) Applicant: SAUDI ARABIAN OIL COMPANY, Dhahran (SA)

(72) Inventors: Ahmed Al Brahim, Thuwal (SA); Abdulwahab Halawani, Thuwal (SA); Fadl Abdellatif, Thuwal (SA); Hesham Jifri, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 369 days.

(21) Appl. No.: 18/326,272

(22) Filed: May 31, 2023

(65) Prior Publication Data

US 2024/0402138 A1 Dec. 5, 2024

(51) Int. Cl.
*G01N 29/265* (2006.01)
*G01B 7/06* (2006.01)
(Continued)

(52) U.S. Cl.
CPC ........... *G01N 29/265* (2013.01); *G01B 7/107* (2013.01); *G01N 29/04* (2013.01); *G01N 29/043* (2013.01);
(Continued)

(58) Field of Classification Search
CPC .... G01N 29/043; G01N 29/265; G01N 29/04; G01N 29/225
See application file for complete search history.

(56) References Cited

U.S. PATENT DOCUMENTS 3,921,440 A * 11/1975 Toth ..................... G01N 29/265
73/622
4,331,034 A * 5/1982 Takeda ................. G01N 29/265
73/637
(Continued)

FOREIGN PATENT DOCUMENTS

CN      104751917 B    10/2017
CN      110530975 A    12/2019
(Continued)

OTHER PUBLICATIONS

TWN Technology, "TWN-10 | Chain-link scanner for small pipe weld inspection," Youtube.com, Internet URL: <TWN-10 | Chain-link scanner for small pipe weld inspection—YouTube> (Dec. 16, 2021), 1 page.
(Continued)

*Primary Examiner* — Helen C Kwok
(74) *Attorney, Agent, or Firm* — Leason Ellis LLP

(57) ABSTRACT

An ultrasonic an ultrasonic inspection device for a pipe or tube includes arcuate shaped first and second housings that are pivotally coupled to one another to allows the ultrasonic inspection device to move between an open position and a closed position. A driving gear assembly is coupled to the arcuate shaped second housing. The driving gear assembly includes a driving gear powered by a gear driving motor, as well as arcuate shaped first and second driven gears that travel within the arcuate shaped first and second guide tracks when the ultrasonic inspection device is in the closed position to permit the arcuate shaped first and second driven gears to be driven in a 360 degree path. An ultrasonic testing (UT) probe assembly is fixedly attached to the arcuate shaped second driven gear and configured for direct contact with the pipe for performing ultrasonic inspection of the pipe or tube.

20 Claims, 22 Drawing Sheets

(51) Int. Cl.
  *G01N 29/04* (2006.01)
  *G01N 29/22* (2006.01)

(52) U.S. Cl.
  CPC ..... *G01N 29/225* (2013.01); *G01N 2291/023* (2013.01); *G01N 2291/101* (2013.01); *G01N 2291/2634* (2013.01)

(56) References Cited

U.S. PATENT DOCUMENTS

| | | | | |
|---|---|---|---|---|
| 4,387,598 | A * | 6/1983 | Jamieson | G01N 29/265 |
| | | | | 73/622 |
| 4,389,894 | A * | 6/1983 | Kajiyama | G01N 29/265 |
| | | | | 376/245 |
| 4,586,379 | A * | 5/1986 | Burkhardt, Jr. | G01N 29/265 |
| | | | | 73/637 |
| 4,672,852 | A * | 6/1987 | Gugel | G01N 29/265 |
| | | | | 376/245 |
| 4,767,048 | A * | 8/1988 | Kimbrough | G01N 29/265 |
| | | | | 104/165 |
| 5,435,405 | A * | 7/1995 | Schempf | B62D 55/265 |
| | | | | 901/44 |
| 7,950,298 | B2 | 5/2011 | Lavoie | |
| 9,551,690 | B2 | 1/2017 | Gaudet et al. | |
| 10,261,053 | B2 | 4/2019 | Ten Grotenhuis et al. | |
| 2005/0056105 | A1 * | 3/2005 | Delacroix | G01N 29/043 |
| | | | | 376/249 |
| 2010/0275694 | A1 * | 11/2010 | Roberts | G01N 29/265 |
| | | | | 73/637 |
| 2012/0204645 | A1 * | 8/2012 | Crumpton | G01N 29/043 |
| | | | | 73/588 |
| 2013/0061664 | A1 * | 3/2013 | Boone | G01B 7/30 |
| | | | | 73/112.01 |
| 2019/0086020 | A1 * | 3/2019 | Wehlin | B25J 9/1664 |

| | | | | |
|---|---|---|---|---|
| 2020/0174478 | A1 * | 6/2020 | Abdellatif | G01S 17/86 |
| 2023/0045635 | A1 | 2/2023 | Abdellatif et al. | |
| 2023/0058202 | A1 | 2/2023 | Abdellatif et al. | |

FOREIGN PATENT DOCUMENTS

| | | |
|---|---|---|
| CN | 111537605 A | 8/2020 |
| CN | 113075294 A | 7/2021 |
| CN | 110412136 B | 3/2022 |
| GB | 1559469 A | 1/1980 |
| WO | 2015080535 A1 | 6/2015 |
| WO | 2017124194 A1 | 7/2017 |

OTHER PUBLICATIONS

Autsolutions CIRC-SCAN:https://autsolutions.net/ndt-products/ndt-scanners/manual-ndt-ut-scanners/circscan-pipe-weld-scanner/; Retrieved from Internet Jun. 8, 2023; 4 pages.

"Autsolutions Revolver: https://autsolutions.net/ndt-products/ndt-scanners/manual-ndt-ut-scanners/revolver/; Retrieved from Internet Jun. 6, 2023; 9 pages.".

"Eddyfi Technologies; NDT Sweeper: https://eddyfi.com/en/product/ndt-sweeper; Retrieved from Internet Jun. 6, 2023; 4 pages."

CD International Technology, Inc., Automated Ultrasonic Pipeline Inspection System; Retrieved on Feb. 2, 2023 from: https://www.cdint.com/pipeline_small.shtml; 2 pages.

"Maocheng Hong, et al.; Lightweight Design of Automatic Inspection Mechanism for Main Coolant Line Welds in Nuclear Power Plant; Retrieved on Feb. 2, 2023 from: https://link.springer.com/chapter/10.1007/978-981-16-7381-8_143 Full version of paper was unavailable but it may be relevant based on the Abstract and provided image; 1 page."

Chen et al.; CGN Inspection Technology Company; Development of Ultrasonic Inspection for Main Coolant Line Welds In EPR Nuclear Power Plant; Retrieved on Feb. 2, 2023 from: https://www.jsm.or.jp/ejam/Vol9No.3/AA/AA146/AA146.pdf; 12 pages.

\* cited by examiner

MOTORIZED CUFFING MECHANISM FOR ULTRASOUND INSPECTION

TECHNICAL FIELD

The present disclosure is directed to devices and systems for inspecting pipes and tubes and more particularly, to a motorized cuff mechanism for ultrasound inspection capable of performing ultrasonic pipe inspection as well as being integrated with robotic crawlers and drones.

BACKGROUND

Corrosion is one of the main threats on the longevity of pipes causing them degrade and thin. Several industries, including the oil and gas, water treatment and distribution, suffer numerous losses due to pipe degradation as it can cause the fluids contained in the pipe to leak leading to loss of production and operations halt. It can also propose a danger on individuals working near these pipes especially if these pipes are containing hazardous chemicals. To combat corrosion, regular and frequent inspections are essential to monitor the integrity of the condition of the pipes. These inspections can be done by ultrasonic thickness.

One technique for testing is a non-destructive techniques (NDT) technique. In this technique, an ultrasonic sound is applied on the pipe and its response is used to determine the pipe thickness. The drawbacks of regular inspection are the large cost and high labor demand. These drawbacks are also intensified if the pipes are located in difficult to reach locations including high positions which commonly call for the use of scaffolding.

There is therefore a need for an improved ultrasonic inspection device that overcomes the above noted deficiencies.

SUMMARY

As mentioned above, the present disclosure is directed to an ultrasound inspection device for pipes and more specifically, is directed to a motorized cuffing mechanism for ultrasound inspection capable of performing circumferential ultrasonic pipe inspection as well as being integrated with robotic crawlers and drones.

In one embodiment, an ultrasonic inspection device for a pipe or tube includes an arcuate shaped first housing having an arcuate shaped first guide track. The arcuate shaped first housing has a first end and an opposite second end spaced from the first end. An arcuate shaped second housing has an arcuate shaped second guide track, with the arcuate shaped second housing having a first end and an opposite second end spaced from the first end. The arcuate shaped first and second housings are pivotally coupled to one another to allow the ultrasonic inspection device to move between an open position in which the second ends of the arcuate shaped first and second housings are spaced apart and a closed position in which the second ends of arcuate shaped first and second housings are joined. A driving gear assembly is coupled to the arcuate shaped second housing. The driving gear assembly includes a driving gear powered by a gear driving motor. The ultrasonic inspection device further includes arcuate shaped first and second driven gears that travel within the arcuate shaped first and second guide tracks when the ultrasonic inspection device is in the closed position to permit the arcuate shaped first and second driven gears to be driven in a 360 degree path around the pipe. An ultrasonic testing (UT) probe assembly is fixedly attached to the arcuate shaped second driven gear and configured for direct contact with the pipe for performing ultrasonic inspection of the pipe or tube.

In another embodiment, an ultrasonic inspection device for a pipe or tube includes an arcuate shaped first housing having an arcuate shaped first guide track. The arcuate shaped first housing has a first end and an opposite second end spaced from the first end. The device further includes an arcuate shaped second housing having an arcuate shaped second guide track. The arcuate shaped second housing has a first end and an opposite second end spaced from the first end. The arcuate shaped first and second housings are pivotally coupled to one another that allows the ultrasonic inspection device to move between an open position in which the second ends of the arcuate shaped first and second housings are spaced apart and a closed position in which the second ends of arcuate shaped first and second housings are joined. A first motor is coupled to the arcuate shaped second housing and is coupled to the arcuate shaped first housing by a first drive shaft such that operation of the first motor pivots the arcuate shaped first housing between open and closed positions. The device further includes an arcuate shaped first eddy current array (ECA) disposed within the first guide track and an arcuate shaped second eddy current array (ECA) disposed within the second guide track. The arcuate shaped first and second eddy current arrays are configured to measure a wall thickness of the pipe when the ultrasonic inspection device is in the closed position.

BRIEF DESCRIPTION OF THE DRAWING FIGURES

DETAILED DESCRIPTION OF CERTAIN EMBODIMENTS

Figure 1:
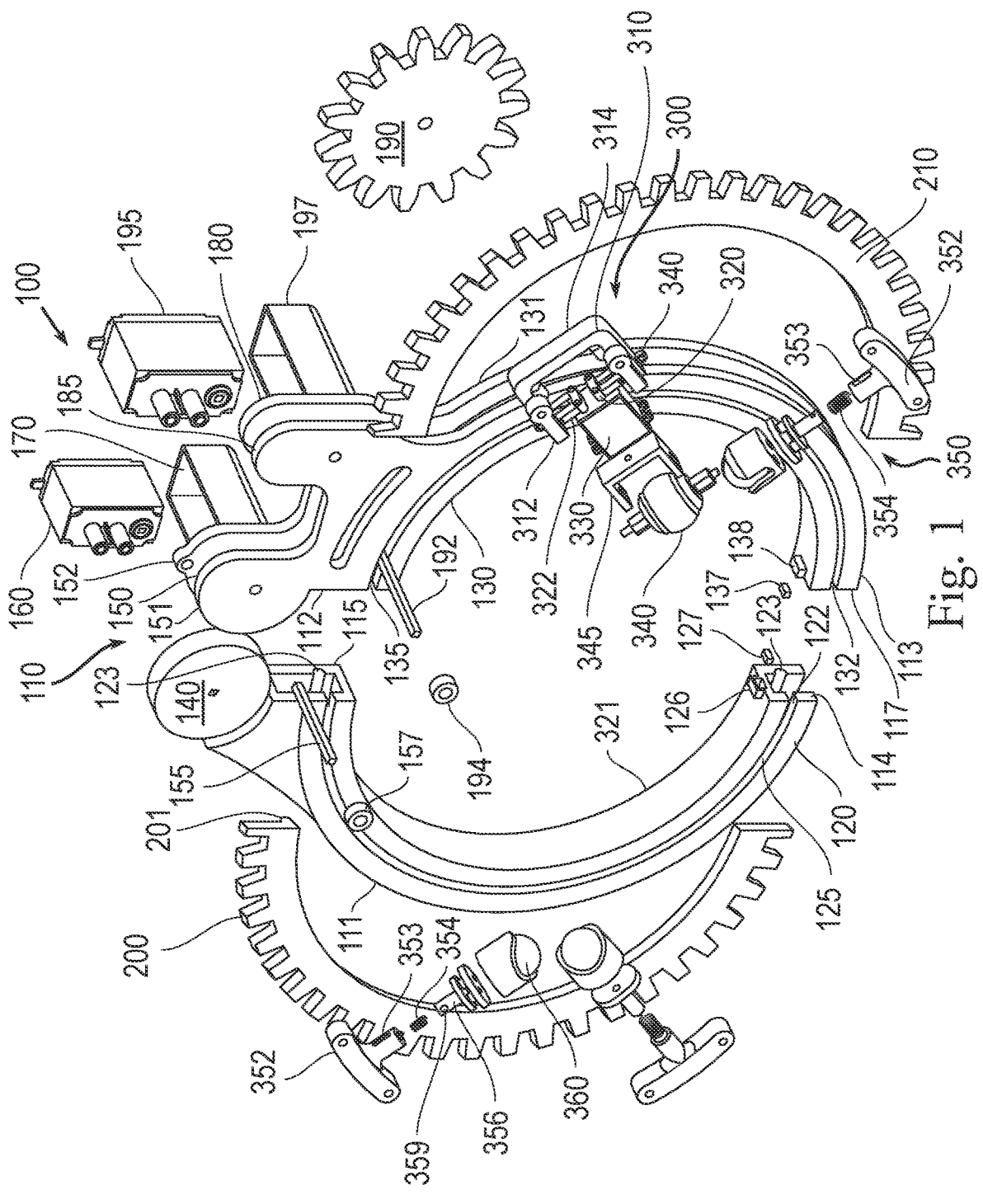
FIG. 1 is an exploded perspective view of an ultrasonic inspection device in accordance with one embodiment.
Figure 2:
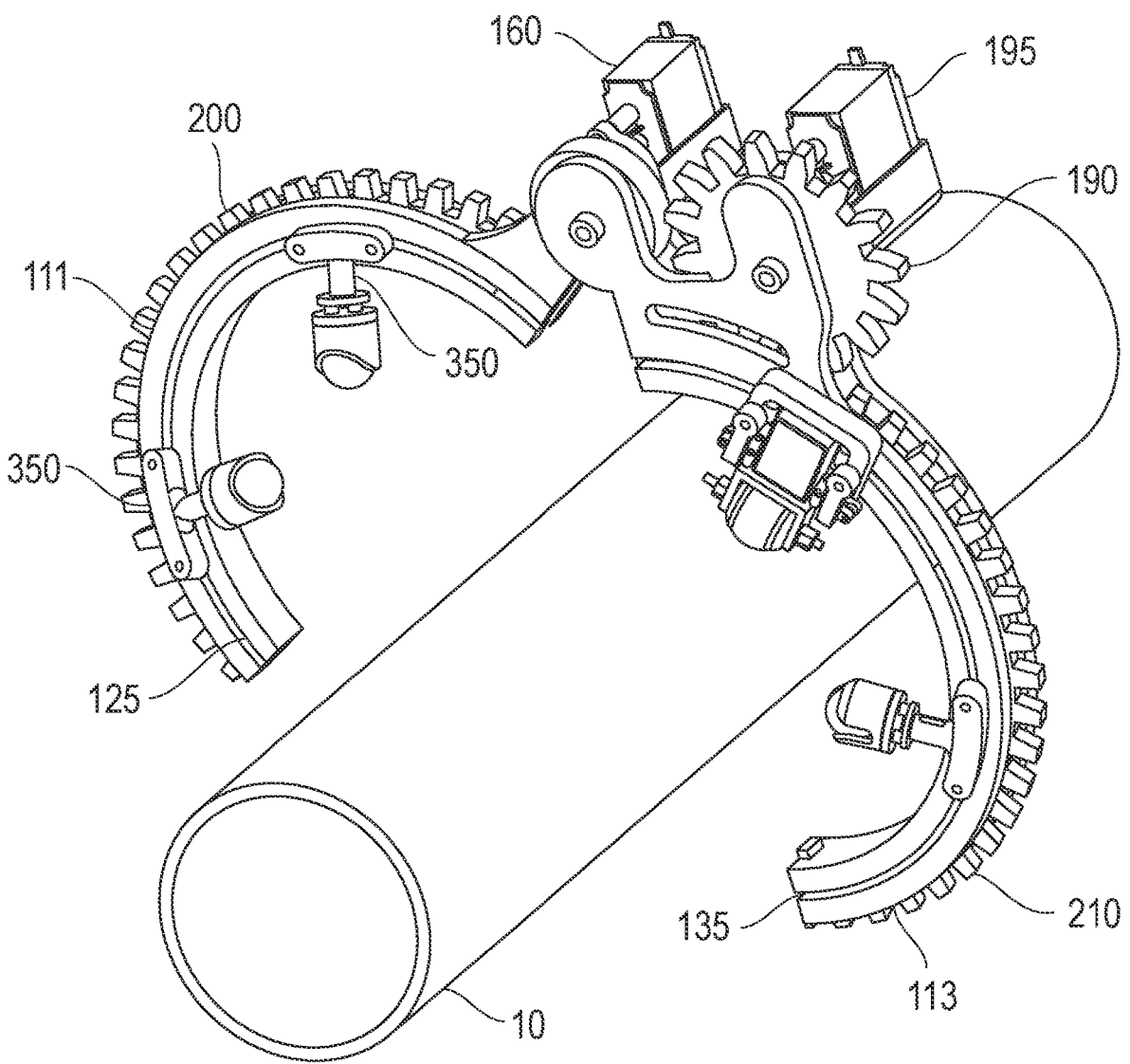
FIG. 2 is a perspective view of the ultrasonic inspection device shown in relation and in contact with a pipe showing a cuff housing in an open position.
Figure 3:
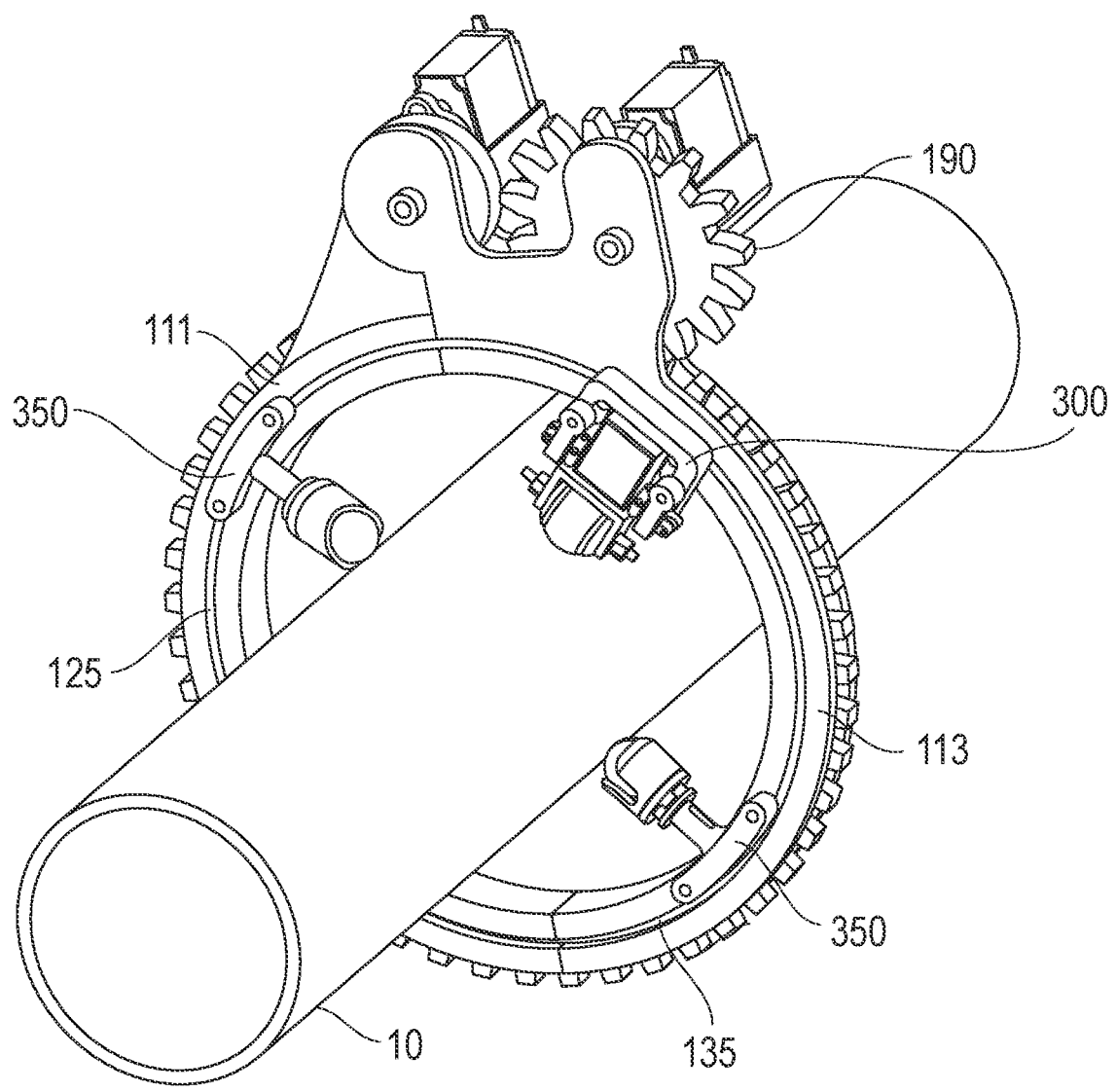
FIG. 3 is a perspective view of the ultrasonic inspection device of FIG. 2 showing the cuff housing in a closed position.

The present disclosure is directed to an ultrasound inspection device for pipes and more specifically, is directed to a motorized cuff mechanism for ultrasound inspection capable of performing circumferential ultrasonic pipe inspection as well as being integrated with robotic crawlers and drones.

As described in more detail below, the ultrasound inspection device of the present disclosure is generally directed to cuff housing that is formed of two parts each of which encloses a driven gear. The two parts of the cuff housing pivot and move between an open position that allows the motorized cuff mechanism to be disposed about a pipe or tube and a closed position in which the motorized cuff mechanism surrounds the pipe or tube. The device further includes a driving mechanism for controllably driving the two driven gears. In one embodiment, the drive mechanism includes a single motor for driving the two driven gears along a 360 degree path. One of the driven gears carries an ultrasonic testing (UT) probe.

Now turning to FIGS. 1-6C in which an ultrasonic inspection device 100 according to one embodiment is illustrated. As described herein, the ultrasonic inspection device 100 is configured to be placed around a pipe 10 for performing inspection and measurements thereof. The ultrasonic inspective device 100 can be described as being a cuff.

The ultrasonic inspection device 100 includes a circular shaped housing 110 that is sized and configured for placement about the pipe. 10. As illustrated and described herein, the circular shaped housing 110 is not placed in direct contact with the exterior surface of pipe 10. In the illustrated embodiment, the circular shaped housing 110 is formed of two parts that are movable relative to one another. More particularly, the circular shaped housing 110 is formed of a first housing 111 and a second housing 113. Each of the first housing 111 and the second housing 113 has an arcuate shape and more particularly, each of the first housing 111 and the second housing 113 can have a semi-circular shaped and thus, can be alternatively described as being a half-ring housing. The arcuate length of the arcuate shaped housing 111, 113 is, in one embodiment, about 180 degrees.

The arcuate shaped first housing 111 has a first end 112 and an opposite second end 114 that is generally opposite the first end 112 and similarly, the arcuate shaped second housing 113 has a first end 115 and an opposite second end 117. The arcuate shaped first housing 111 is defined by a first face 120 and an opposite second face 121 with a first track 122 being defined therebetween. The first track 122 acts as a gear guide as described below and there is also a gear extrusion slot 123 that is in communication with and open to the first track 122. As shown, the gear extrusion slot 123 can be in the form of a groove (e.g., concave shaped groove). The gear extrusion slot 123 is formed in the second face 121. The first face 120 also includes a first guide slot 125 that, like the first track 122 and gear extrusion slot 123, is open at the two ends 112, 114.

The second end 114 has a first magnet housing 126 that can be located along an inner face of the arcuate shaped first housing 111. The first magnet housing 126 houses a first magnet 127 that has an exposed surface that faces the arcuate shaped second housing 113.

The arcuate shaped second housing 115 has a first end 138 and an opposite second end 117. Similarly, the arcuate shaped second housing 113 is defined by a first face 130 and an opposite second face 131 with a second track 132 being defined therebetween. Given the arcuate shape of the first housing 111 and the second housing 113, each of the track 122, 132 is also arcuate shaped. Each track 122, 132 is open at its opposite ends.

The second track 132 acts as a gear guide as described below and there is also a gear extrusion slot (not shown but identical to the gear extrusion slot 123) that is in communication with and open to the second track 132. As shown, the gear extrusion slot can be in the form of a groove (e.g., concave shaped groove). The gear extrusion slot is formed in the second face 131. The first face 130 also includes a second guide slot 135 that, like the second track 132 and gear extrusion slot, is open at the two ends.

The second end 117 has a second magnet housing 138 that can be located along an inner face of the arcuate shaped second housing 113. The second magnet housing 136 houses a second magnet 137 that has an exposed surface that faces the arcuate shaped first housing 111.

As illustrated and mentioned, the first housing 111 and the second housing 113 pivot relative to one another and are coupled to one another at the first ends 112, 115 thereof. The first end 112, 115 are thus directly coupled to one another and always remain coupled to one another, while the second ends 114, 117 are in selective coupling with one another. More specifically, in the open position of the circular shaped housing 110, the second ends 114, 117 are spaced apart and not coupled to one another, while in the closed position of the circular shaped housing 110, the second ends 114, 117 are coupled to one another. As will be described herein, the second ends 114, 117 can engage and be joined together by magnetic attraction due to the presence of the first and second magnets 127, 137 as the second ends 114, 117 are moved in proximity to one another. The magnetic attraction can be overcome when the second ends 114, 117 are separated from one another under applied force.

The first end 112 of the arcuate shaped first housing 111 includes a first coupler 140, while the first end 115 of the arcuate shaped second housing 113 includes a second coupler 150. The first and second couplers 140, 150 are complementary to one another and define the pivot point (axis) of the arcuate shaped first and second housing 111, 113.

In the illustrated embodiment, the first and second couplers 140, 150 generally are in the form of a hinge. The first coupler 140 is a circular shaped disk with a center hole formed therethrough. The second coupler 150 is in the form of two parallel, spaced apart walls 151, 152 with an open space or slot therebetween that receives the first coupler 140. Each of the walls 151, 152 includes a center hole. The first coupler 140 is thus inserted into the open space between the walls 151, 152 resulting in the center hole of the first coupler 140 aligning with the center holes formed through the walls 151, 152. The circular shape of the first coupler 140 allows the first coupler 140 to freely rotate resulting in the pivoting of the arcuate shaped first housing 111 relative to the arcuate shaped second housing 113. Each of the first and second couplers 140, 150 are formed so as to not interfere and impede upon the first and second tracks.

To rotationally join the first and second couplers 140, 150 to one another, a first drive shaft 155 is used that passes through the center holes of each of the first and second couplers 140, 150. A first bearing 157 can also be provided.

The first drive shaft 155 is operatively coupled to a first motor 160 such that powering on the first motor 160 causes rotation of the first drive shaft 155 in either a first direction or a second direction. As described herein, rotation of the first drive shaft 155 in the first direction causes the arcuate shaped first housing 111 to open relative the arcuate shaped second housing 113 and conversely, rotation of the first drive shaft 155 in the second direction causes the arcuate shaped first housing 111 to close relative to the arcuate shaped second housing 113.

The arcuate shaped second housing 113 further includes a first motor housing 170 that is located proximate the second coupler 150 and is configured to hold the first motor 160. The first motor housing 170 can be located behind the second coupler 150 since the first drive shaft 155 must pass through the center holes of the second coupler 150 and be attached to the first motor 160. The second coupler 150 and first motor housing 170 are thus located at the first end 115 of the arcuate shaped second housing 113.

The arcuate shaped second housing 113 also includes a gear support 180 that is spaced from the second coupler 150 and thus spaced from the first end 138. Like the second coupler 150, the gear support 180 is formed of a pair of parallel, spaced apart walls with an open space 185 therebetween. The open space 185 is aligned and within the plane of the second track 132 and thus, the two are in direct communication with one another.

Within the open space 185, a driving gear 190 is rotatably mounted. The driving gear 190 can be a circular shaped toothed gear. A second drive shaft 192 is coupled to the driving gear 190 using a second bearing 194 such that rotation of the second drive shaft 192 causes rotation of the driving gear 190. Rotation of the second drive shaft 192 in one direction causes rotation of the driving gear 190 in the one direction and rotation of the second drive shaft 192 in the opposite direction causes rotation of the driving gear 190 in the opposite direction. The second drive shaft 192 is coupled to a second motor 195.

The second motor 195 is contained within a second motor housing 197 that is attached to the arcuate shaped second housing 113 and aligned within the gear support 180 such that the second drive shaft 197 that is coupled to the second motor 195 passes through the gear support 180.

As mentioned, the ultrasonic inspection device 100 includes a drive mechanism. The drive mechanism includes the driving gear 190. The first and second motors 160, 195 serve different purposes, as will be appreciated, in that the first motor 160 is designed to open and close the housing 110, while the second motor 195 is designed to rotate the driving gear 190.

The first and second motors 160, 195 are configured to operate independently from one another; however, the two motors 160, 195 are preferably in communication with a master controller that controls operation of the two motors. The master controller can send control signals to the two motors 160, 195 to control operation thereof and in normal operation, the two motors 160, 195 operate at different times. In particular and as described in more detail herein, the opening or closing of the housing 110 is performed first and the second motor 195 only operates when the housing 110 is in the closed position and the arcuate shaped first and second housing 111, 113 are joined and the first and second tracks 122, 132 define a continuous 360 degree path. The master controller can thus be programed to only allow operation over the second motor 195 when the housing 110 is in the closed position.

In addition, the driving gear 190 is positioned so that it is aligned with the center of the second track 132. In other words, the driving gear 190 lies in a common plane that passes through the center of the second track 132.

Another component of the drive mechanism is a pair of driven gears, namely a first driven gear 200 and a second driven gear 210. Each of the first and second driven gears 200, 210 is configured to be operatively coupled to the driving gear 190 such that movement of the driving gear 190 is translated into movement of the first and second driven gears 200, 210.

Each driven gear 200 210 is disposed within one or more of the arcuate shaped tracks 122, 132 and has a complementary shape so that it can be driven within the tracks 122, 132 in a circumferential manner. In other words, the driven gear 200, 210 is configured to travel seamlessly within each of the arcuate shaped tracks 122, 132 and be passed from one arcuate shaped track 122, 132 to the other arcuate shaped track 122, 132 as described herein. In other words, the semi-circular shaped driven gears 200, 210 are driven around the complete 360 degree circular track defined by the first and second tracks 122, 132. It will be appreciated that as each arcuated shaped driven gear 200, 210 is driven, one of the arcuate shaped driven gears 200, 210 will be in direct contact (meshed with) the single driving gear 190. The arcuate shaped driven gear 200, 210 that is directly engaged with the driving gear 190 abuts the other arcuate shaped driven gear 200, 210 and thus movement (rotation) of the arcuate shaped driven gear 200, 210 that is directly engaged with the driving gear 190 causes the other arcuate shaped driven gear 200, 210 to likewise be rotated within the combined tracks 122, 132 that define a continuous circular track. It is thus possible, in certain positions, to consider one of the arcuate shaped driven gears 200, 210 to be master driven gear and the other of the arcuate shaped driven gears 200, 210 to be a slave driven gear that advances due to the driving action of the master driven gear.

Accordingly, each of the driven gears 200, 210 can comprise an arcuate shaped gear that has an arcuate length of about 180 degrees. Each of the driven gears 200, 210 has outwardly facing teeth as shown that are position to engage and mesh with the teeth of the circular shaped driving gear 190.

As described below, this construction of the first and second driven gears 200, 210 allows the driven gears 200, 210 to be driven 360 degrees around the pipe 10 using a single driving gear 190.

As mentioned, each driven gear 200, 210 has outwardly facing teeth that extend along the complete arcuate length of the driven gear 200, 210. The teeth are configured (sized and spaced) so that they mesh with the teeth of the driving gear 190 to allow the first and second driven gears 200, 210 to be driven in a circumferential manner when the driving gear 190 rotates under action of the second motor 195.

In addition, each of the first and second driven gears 200, 210 has a gear extrusion 201, respectively, that faces rearwardly. The gear extrusion 201 is configured to be received within each of the gear extrusion slots 123 depending on whether the first driven gear 200 resides in the arcuate shaped first housing 111 or the arcuate shaped second housing 113, respectively. Similarly, the gear extrusion 211 is configured to be received within each of the gear extrusion slots 123 depending on whether the second driven gear 210 resides in the arcuate shaped first housing 111 or the arcuate shaped second housing 113, respectively. The gear extrusion 201 thus has a complementary shape to the gear extrusion slot 123 to allows the gear extrusion to be received into and freely travel within the gear extrusion slot when the first and second driven gears 200, 210 are driven within the arcuate shaped first and second housings 111, 113.

Thus, when the housing 110 is in the closed position, the arcuate shaped first and second housings 111, 113 are in contact with one another and act as one. The combined driven gear will be prevented from slipping to the side due to the presence of the arcuate shaped track 122, 132, which acts as cuff gear guide enclosure, which also ensures that both halves of the driven gear are aligned with each other. The gear extrusions 201 act to prevent the driven gear from slipping outside the housing 110 when it is not closed (i.e., when the housing 110 is in the open position) due to the extra resistance it provides by matching the gear extrusion slots formed in the arcuate shaped first and second housings 111, 113. Since in the closed position, the tracks 122, 132 form a continuous 360 degree pathway, the gear extrusion seamlessly passes from one gear extrusion slot 123 into the other gear extrusion slot.

It will be understood that as shown in the figures, the housing 110 moves between the open position (FIG. 2) and the closed position (FIG. 3) under action of the first (cuff) motor 160. To permit the ultrasonic inspection device 100 to be positioned relative to and around one pipe 10 or tube of interest, the housing 110 is moved to the open position resulting in the arcuate shaped first and second housings 111, 113 separating from one another, thereby creating a space through which the pipe 10 can be inserted. It will be understood that in the open position, the tracks 122, 132 are separated and not continuous and thus, the driven gears 200, 210 are not driven by the second motor 195. As mentioned, the magnets 127, 137 attach the two second ends of the housings 111, 113 in a detachable manner. The power of the first motor 160 is sufficient to overcome the magnetic coupling force between the two magnets 127, 137. Once the device 100 is properly positioned relative to the pipe 10, the first motor 160 is operated to close the arcuate shaped first and second housings 111, 113 and bring the magnets 127, 137 into contact with one another, thereby closing the housing 110.

As shown, clockwise rotation of the driving gear 190 results in the arcuate shaped first and second driven gears 200, 210 being driven in a counterclockwise direction. Conversely, counterclockwise rotation of the driving gear 190 results in the arcuate shaped first and second driven gears 200, 210 being driven in a clockwise direction. The combined ring defined by the arcuate shaped driven gears 200, 210 thus moves as a single ring along a 360 degree path defined by the closed arcuated shaped first and second housings 111, 113.

As will be described herein and as shown in the figures, during operation one or both of the arcuate shaped first and second driven gears 200, 210 meshes with the driving gear 190 as the arcuate shaped driven gears 220, 210 moves circumferentially about the pipe 10.

The drive mechanism also functions as a carrier for the ultrasonic testing equipment and more particularly, the arcuate shaped second driven gear 210 carries an ultrasonic testing (UT) probe assembly 300. The UT probe assembly 300 is at a fixed location along the arcuate shaped second driven gear 210 and thus, as the arcuate shaped second driven gear 210 is driven and moves along its circumferential pathway, the UT probe assembly 300 moves likewise. In the illustrated embodiment, the UT probe assembly 300 is fixed at a center location (arcuate midpoint) of the arcuate shaped second driven gear 210. However, it will be appreciated that the UT probe assembly 300 can be placed at other locations along the arcuate shaped second driven gear 210.

In the illustrated embodiment, the UT probe assembly 300 comprises a gear/UT probe holder 310 that is attached to the arcuate shaped second driven gear 210 using conventional techniques, such as the use of fasteners (screws). As shown, the gear/UT probe holder 310 is attached to a first face (first side) of the arcuate shaped second driven gear 210. The gear/UT probe holder 310 can be generally U-shaped and includes first and second legs 312 connected with a crossbar 314.

The gear/UT probe holder 310 has two pairs of slots formed therein. The first pair of slots contain and are configured to guide springs which are pushing against a pair of guiders 320. The other pair of slots are for arms 322 of the guiders 320 to restrict their motion to the vertical side only. In other words, the guiders 320 only move vertically within the gear/UT probe holder 310. As shown, each guider 320 is U-shaped with the legs 322 received within the one pair of slots in the gear/UT probe holder 310 results in the legs 322 facing outwardly, while the closed off ends of the guiders 320 being located internally within the open space of the gear/UT probe holder 310. The one pair of slots thus acts as a guide channel to control the movement of the guiders 320.

The gear/UT probe holder 310 also functions as a motor housing that received a motor 330. The motor 330 can be in the form of a servo motor, with the two U-shaped guiders 320 being coupled to two sides of the motor 330. There are also a pair of guider locks 340 that are located at the ends of the legs 322 with a screw of the one pair of slots of the gear/UT probe holder 310 to limit the direction of the guiders 320 in the vertical direction. The two guiders 320 are pressed against by the springs, the amount of the compression of the springs matches the normal force exerted against the assembly 300 by the pipe 10 or tube to be inspected. In other words, the spring serve to ensure that the assembly 300 remains pressed against and in contact with the outer surface of the pipe 10 or tube to be inspected. The motor 330 is preferably battery powered and includes a drive shaft that is driven by the motor. The drive shaft can have a short length as shown.

The UT aspect and functionality of the equipment is achieved by a UT probe 340 that is operatively coupled to the motor 330 and more particularly, the UT probe 340 is coupled to the motor drive shaft such that incremental movement of the motor drive shaft causes incremental movement (adjustment) of the UT probe 340. The UT probe 340 comprises an ultrasonic wheel probe. The wheel probe is an ultrasonic transducer assembly that allows rolling contact of a transducer over a surface.

The UT probe 340 is coupled to the drive shaft with a UT probe adapter or coupler 345. The UT probe adapter 345 is a U-shaped structure defined by a pair of legs with a crossbar. The UT probe adapter 345 is fixedly attached to the motor 340. The UT probe 340 is disposed between the pair of legs of the adapter 345 and coupled thereto with an axle that permits the UT probe 340 to freely rotate. The crossbar of the UT probe adapter 345 comprises the structure that is fixedly coupled to the motor drive shaft and therefore, when the drive shaft is rotated, the UT probe adapter 345 rotates and likewise the UT probe 340 itself rotates. It will be appreciated that the motor 330 is thus utilized to change the direction of the inspection since the inspection could be along the circumference of the pipe 10 as well as along its longitude. In FIG. 48, the UT (wheel) probe 340 is oriented for traversing the circumference of the pipe 10. To traverse in the longitudinal direction, the UT (wheel) probe 340 would be rotated 90 degrees.

As will be understood by one skilled in the art and as mentioned above, the springs in the gear/UT probe holder 310 apply a force to the motor 330 to cause the UT (wheel) probe 340 to be pressed into contact with the pipe 10 to ensure good contact between the UT (wheel) probe 340 and the surface of the pipe 10. The springs also permit the device 100 to be used with different sizes of pipes 10 since for larger sized pipes 10, the springs can compress to permit the UT (wheel) probe 340 to be in contact with the surface of the larger pipe 10. In any event, the springs apply a force to the UT (wheel) probe 340 that ensures that the UT (wheel) probe 340 remains in contact with the pipe surface.

The device also comprises a plurality of caster ball assemblies 350. Each caster ball assembly 350 includes a holder 352 that can have a T-shape with the top leg being fixedly attached to one of the first driven gear 200 and the second driven gear 210. Since the second driven gear 210 carries the assembly 300, the second driven gear 210 can include one assembly 350, while the first driven gear 200 includes two assemblies 350. The short leg of the assembly 300 includes a guide slot 353. The short leg is hollow and houses a spring 354. A caster ball adapter 356 is provided and includes a step against which the spring 354 seats and/or is coupled such that the spring 354 applies a biasing force against the adapter 356. The adapter 356 includes a base portion to which a caster ball 360 is coupled. The caster ball 360 freely rolls in any direction. A fastener (screw) can be received within the guide slot 353 and pass through a hole 359 in the stem of the adapter 356 to limit the rest of the assembly 350 mobility to the vertical direction.

The working principles of the device 100 consist of two main processes, namely, the cuffing process and the inspection process. In the cuffing process, the circular cuff (i.e., the housing 110) will be initially open around the intended pipe 10 or tube for inspection given that pipe diameter is smaller than the inner cuff diameter.

When the right cuff inner curve bottom edge (i.e., the bottom (second) end of the arcuate shaped second housing 113) is below the pipe 10 or tube and its top edge (first end) is above it, the (cuffing) first motor 160 is turned on to close the cuff around the pipe 10 or tube. More particularly, operation of the first motor 160 causes the arcuate shaped first housing 111 and the contained first driven gear 200 to close around the pipe 10 or tube.

The embedded first and second magnets 127, 137 at the ends of the arcuate shaped first and second housings 111, 113 ensure that both sides of the cuff (device 100) are aligned and will provide extra security against unintended opening of the cuff (device 100). The springs in the UT inspection assembly 300 and caster ball assemblies 350 press against the pipe 10 or tube which will serve two objectives. The first is to ensure that the pipe 10 or tube is centered within the inner diameter of the cuff (device 100) for proper circumferential UT inspection. The second is to enable the testing of pipes or tubes with different diameters given that they are less than the inner cuff diameter (inner diameter of the housing 110).

Once the cuff (device 100) is closed around the pipe 10 or tube, the UT inspection process can start. The direction of UT inspection if it is along the circumference or the longitude, or at an angle for the helical inspection process (will be discussed later) of the pipe 10 should be specified by rotating the UT probe 340 using the servo motor 330. Following this step, the UT inspection process could start by turning on the (driving gear) second motor 195 which in turn will rotate the driving gear 190 meshing against one of the driven gears 200, 210. In the case of circumferential testing, the driven gears 200, 210 will move along the pipe diameter and the measurement of the pipe thickness will be taken along it by means of the UT inspection system 300. If the inspection is meant to be taken along the pipe longitude, the servo motor 330 will adjust the orientation of the UT probe 340 first so that it faces the longitude of the pipe 10. Following this step, the (gear driving) first motor 160 should be utilized to rotate the UT probe to the desired clock position along the pipe or tube by the rotation of the driven gears 200, 210. Finally, the entire cuff mechanism (device 100) should be moved along the pipe 10 using any of the different means that will be discussed in the subsequent embodiments to get a line UT inspection along the pipe 10.

Figure 4A:
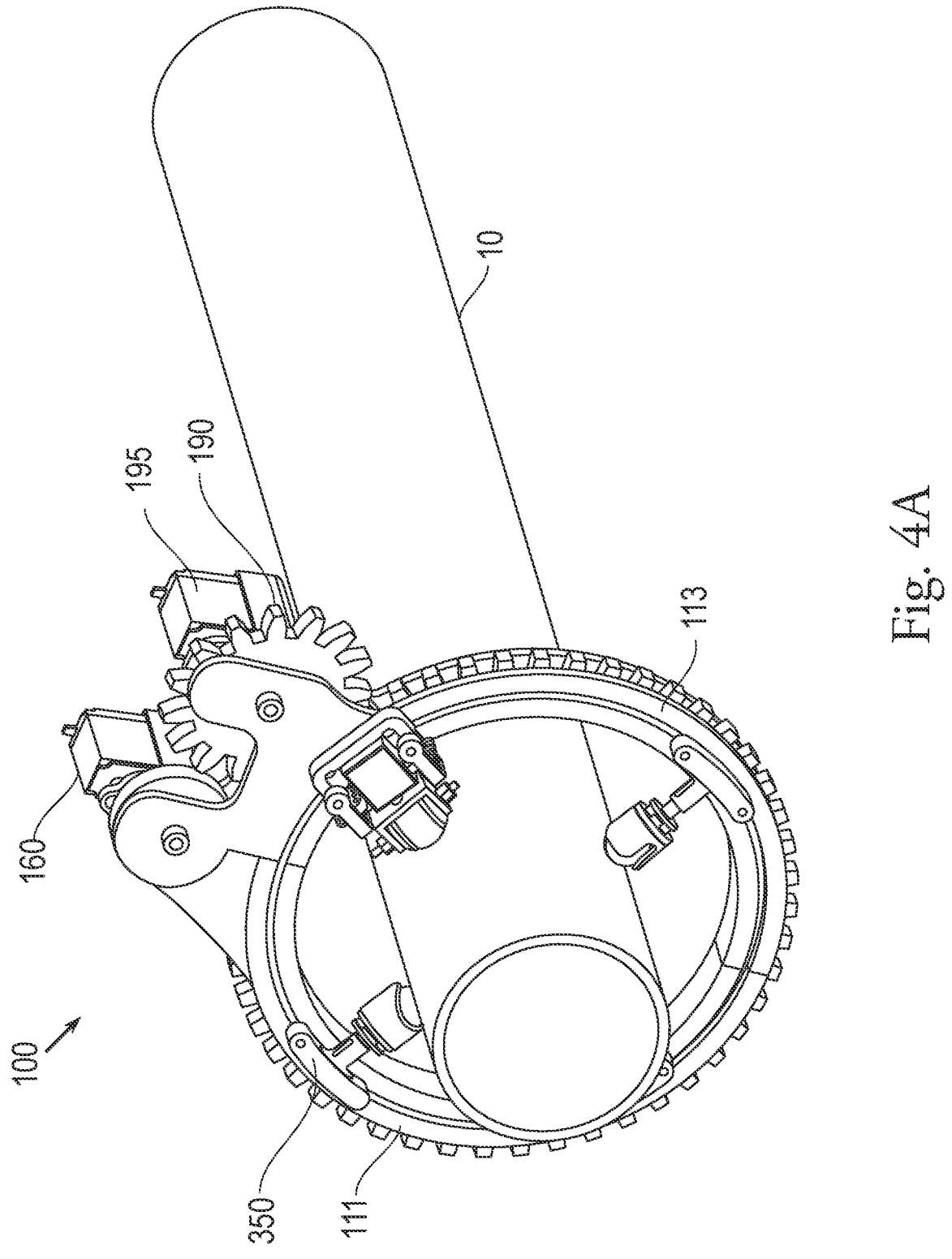
FIG. 4A is a perspective view of the ultrasonic inspection device of FIG. 2 showing the cuff housing in the closed position and the probe in a first position.
Figure 4B:
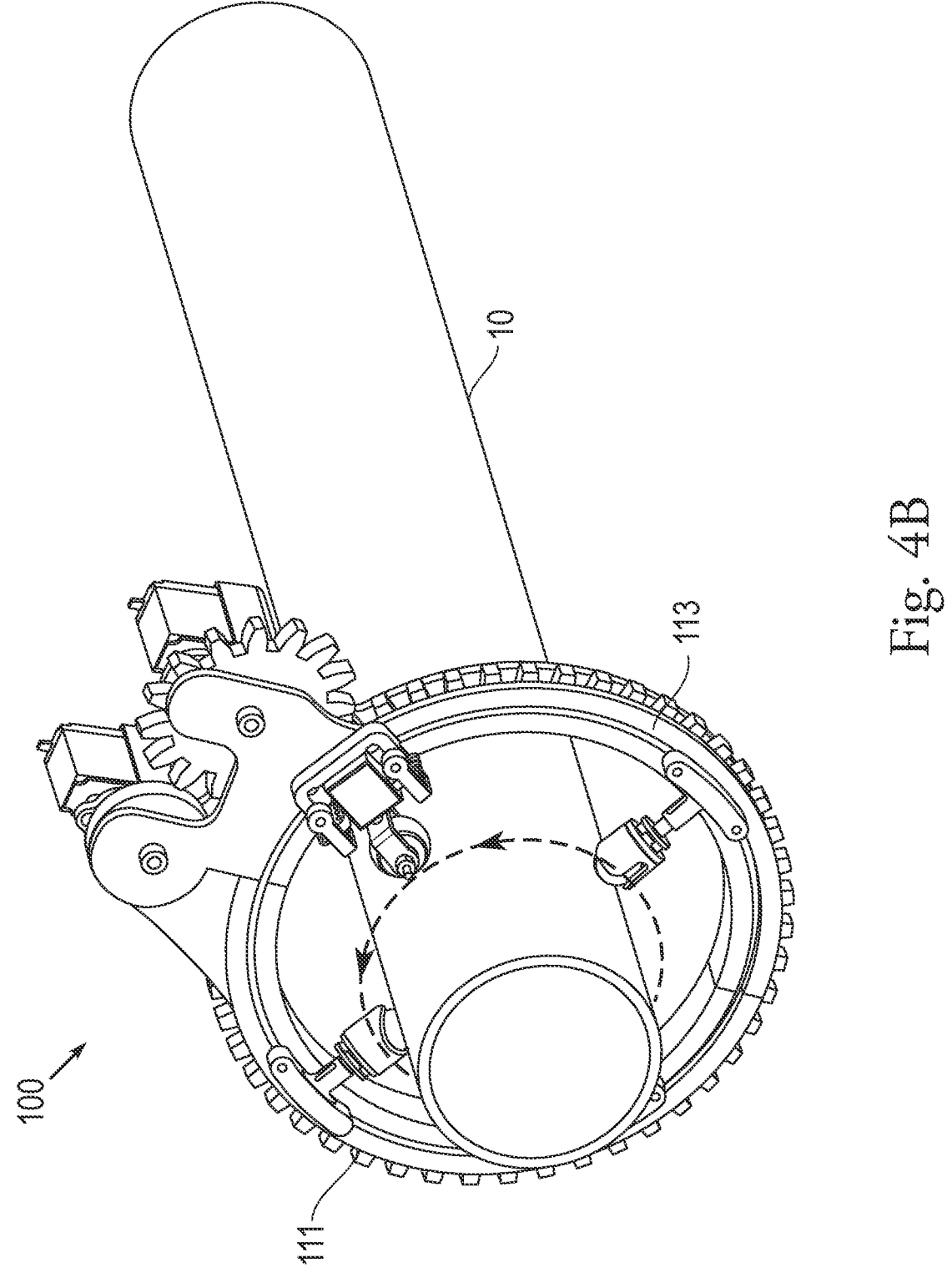
FIG. 4B is a perspective view of the ultrasonic inspection device of FIG. 2 showing the cuff housing in the closed position and the probe in a second position.

FIG. 4B illustrates UT probe inspection along the circumference of the pipe 10. As mentioned, first the servo motor 330 is operated to ensure that the UT probe 340 is facing the circumference of the pipe 10 as shown in FIG. 4B. Next, the UT probe 340 moves along the pipe diameter as can be seen in FIG. 4B to obtain measurement readings along the circumference of the pipe by the action of the gear driving first motor 160.

Figure 5A:
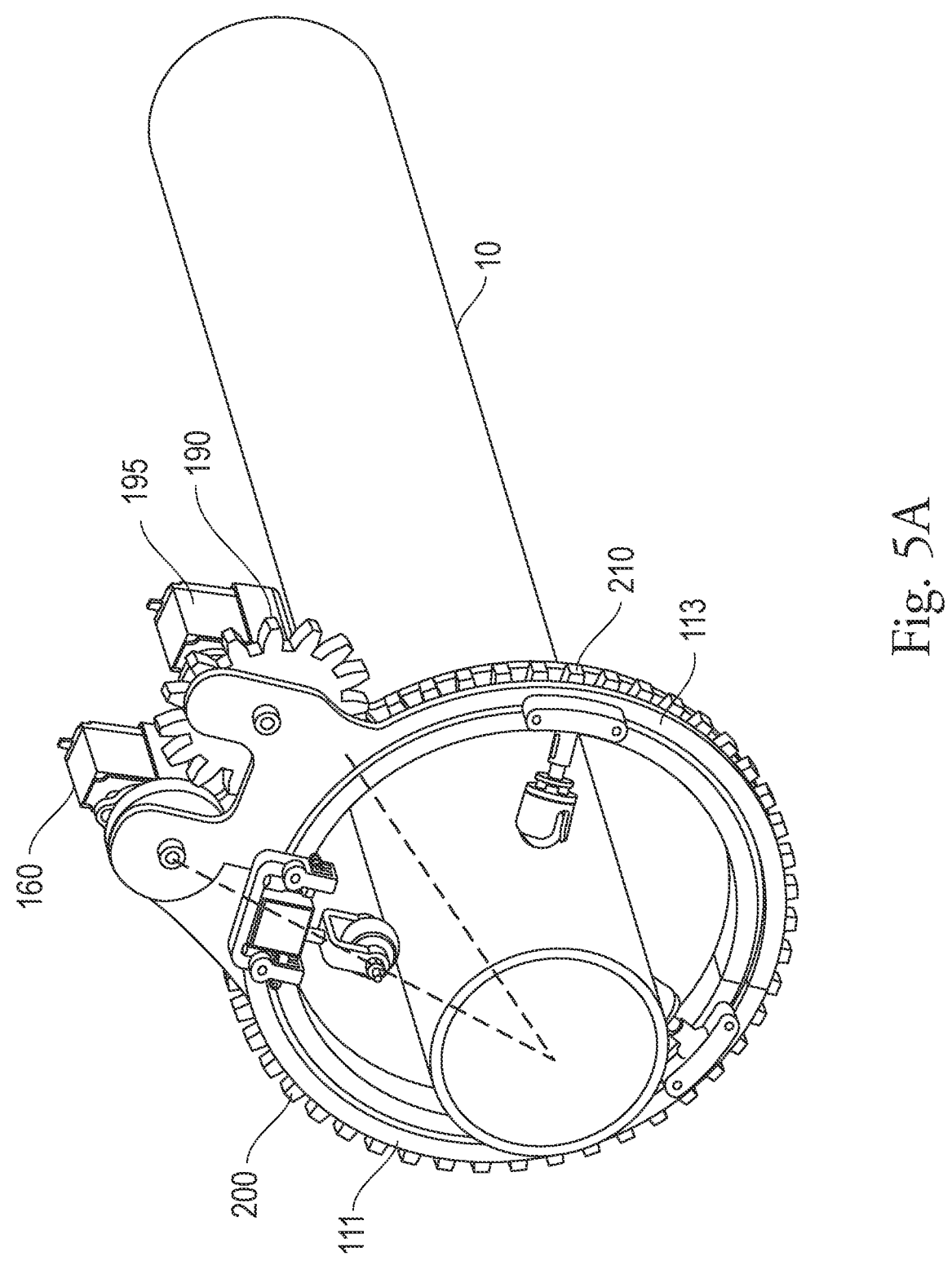
FIGS. 5A-5C are perspective views of the ultrasonic inspection device of FIG. 2 showing UT probe inspection along the longitude of the pipe.
Figure 5B:
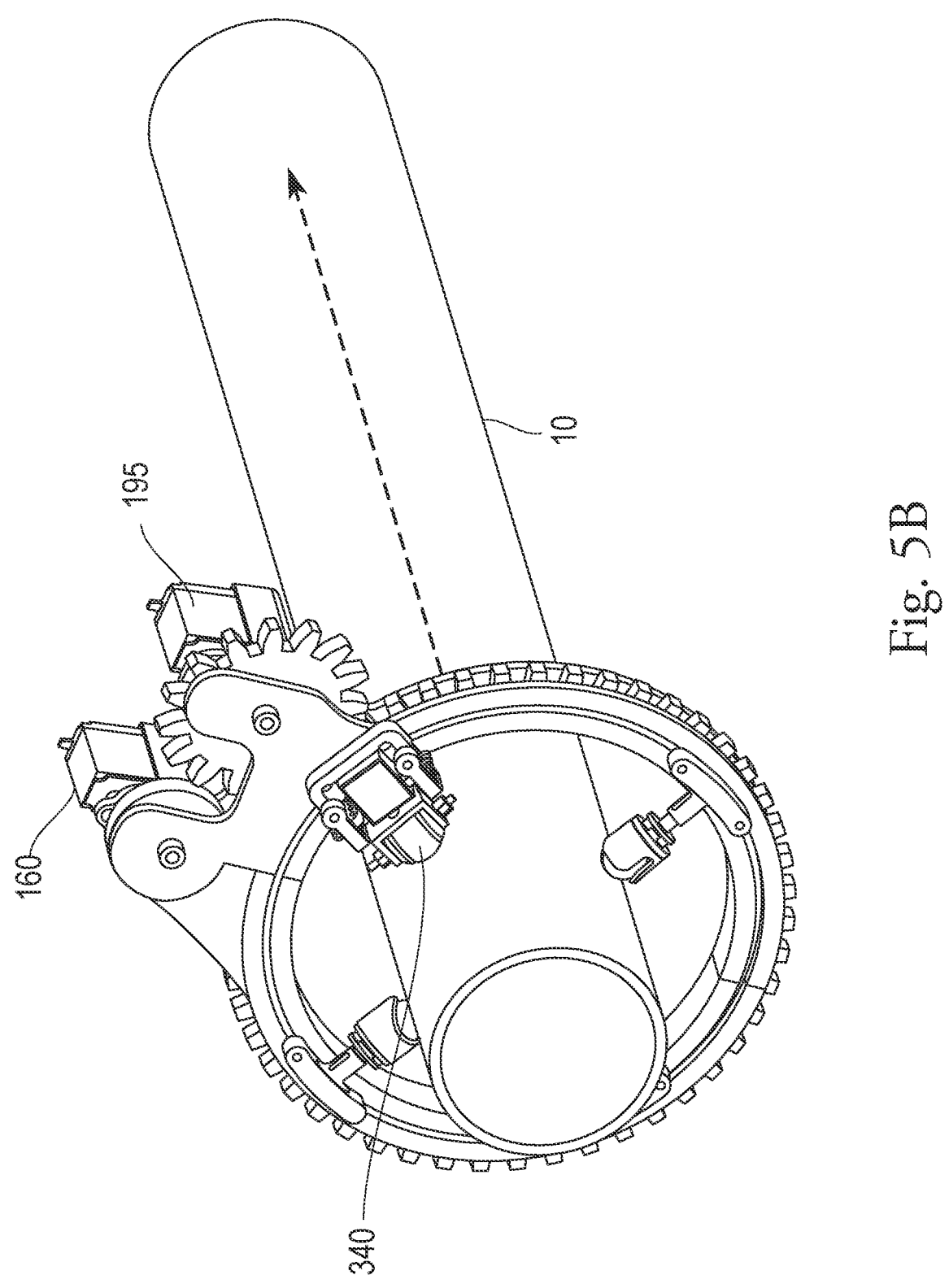
Figure 5C:
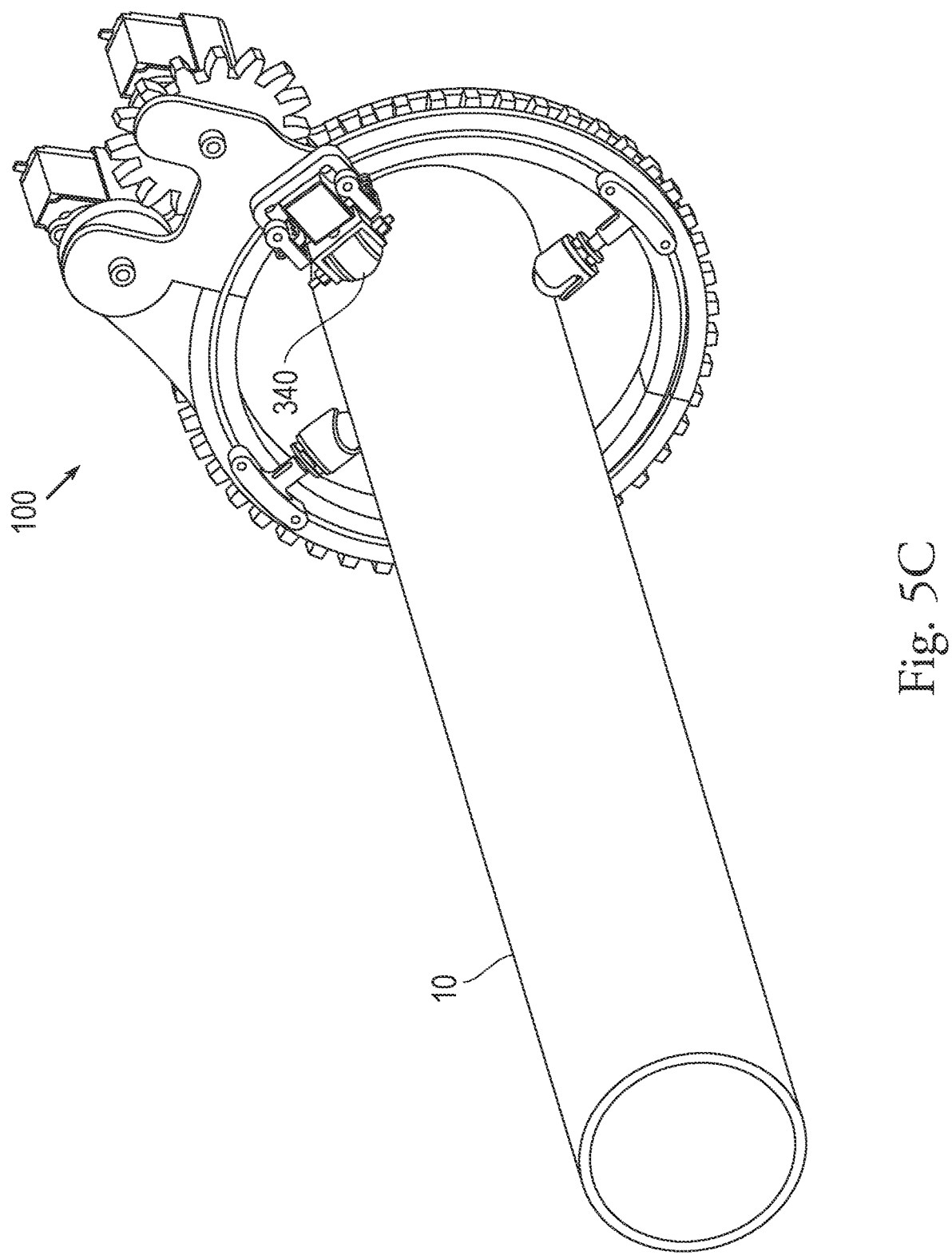
Figures 6A, 6B, 6C:
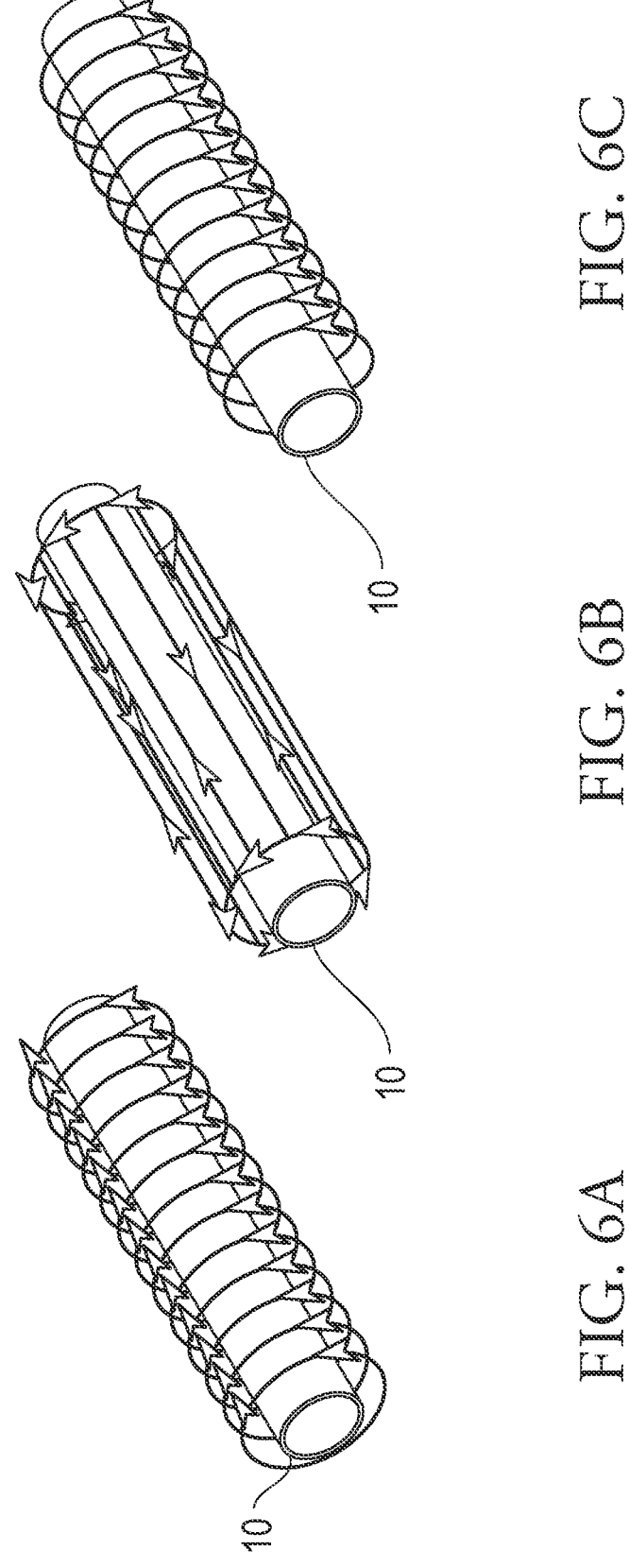
FIG. 6A shows a path for circumferential UT testing.
FIG. 6B shows a longitudinal inspection path for a UT probe.
FIG. 6C shows a helical path for the UT probe.

Now referring to FIGS. 5A-5C which illustrate UT probe inspection along the longitude of the pipe 10. First, the servo motor 330 should be utilized to ensure that the UT probe 340 is facing the longitude of the pipe 10 (FIG. 5A). Second the UT probe 340 should be rotated to desired clock position along the pipe 10 as can be seen in FIG. 5B by the movement of the driving gear 190 by the action of the gear driving motor 195. The device 100 (cuff) is moved laterally to obtain a line of UT measurement as can be seen in FIGS. 5A-5C.

With intensive testing, the entire area of the pipe 10 or tube can be inspected which is known as the pipe C-scan. In the case of the circumferential UT testing, after each 360 degrees rotation of the UT probe 340, the UT probe 340 should be moved slightly to the side and another 360 degrees probe rotation should be completed before moving the device (cuff) 100 again (See, FIGS. 4B and 6A). This process is repeated until the entire area of the pipe 10 has been inspected. In the case of the longitudinal inspection, the device (cuff) 100 is moved from the start of the area of the pipe 10 or tube intended for inspection until its end. This will result in a line measurement along the pipe. Following this movement, the driving gear 190 is turned on to rotate the UT probe 340 slightly and the device (cuff) 100 is moved back laterally to the start of the area resulting in another line reading (See, FIG. 6B). Following this, the UT probe 340 should be rotated slightly and the device (cuff) 100 is moved forward along the pipe 10 again. This process is repeated until the entire pipe 10 is inspected. Finally, the scan can be done helically by angling the device (cuff) 100 slightly and continuously rotating the UT probe 340 and moving the device (cuff) 100 slowly to the side (See, FIG. 6C). The resolution of the scan can be changed based on the distance between each test as well as the accuracy of the motors.

Wire guiding rings or brushed slip rings could be installed on the device (cuff) 100 for the continuous rotation of the mechanism around the pipe 10 while avoiding the risk of wire entanglement of the wires or wrapping them around pipe 10. Finally, before opening the cuff mechanism, it is critical to ensure that each half of the gear (i.e., one of the arcuate shaped first and second driven gears 200, 210) is only within one side of the device (cuff) 100 otherwise the cuff will not open unless the gear is broken. In other words, each driven gear 200, 210 is fully contained within only one of the arcuate shaped first and second housings 111, 113. This can be done by programing the gear driving motor 195 to return to an origin value (start position) (which will cause the driven gears 200, 210 to move so that each is only within one of the first and second housings 111, 113).

Combination of the Ultrasonic Inspection Device 100 with a Crawling Vehicle 400

Figure 7:
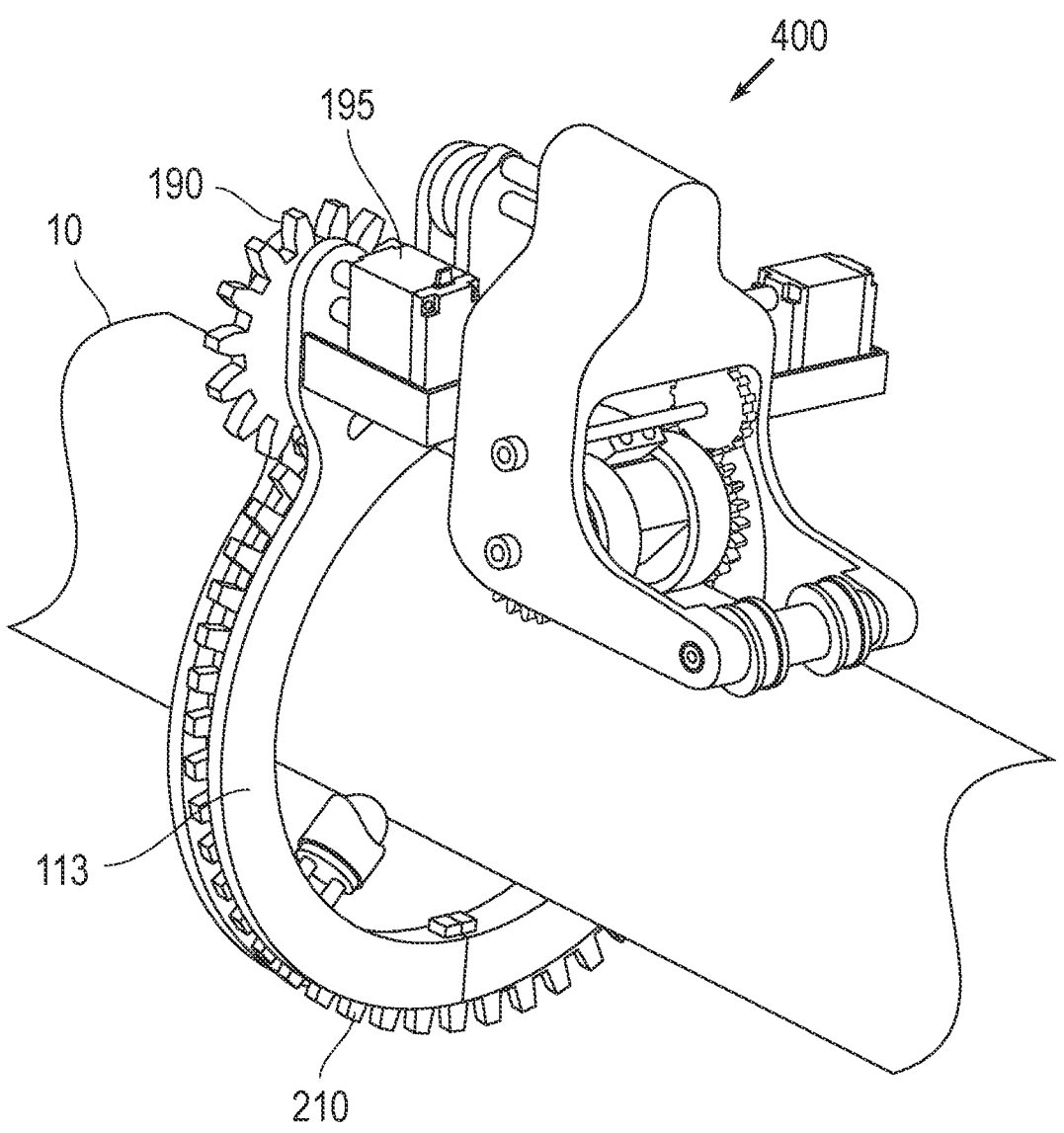
FIG. 7 is a perspective view of the ultrasonic inspection device of FIG. 1 in combination with a crawling vehicle.
Figure 8:
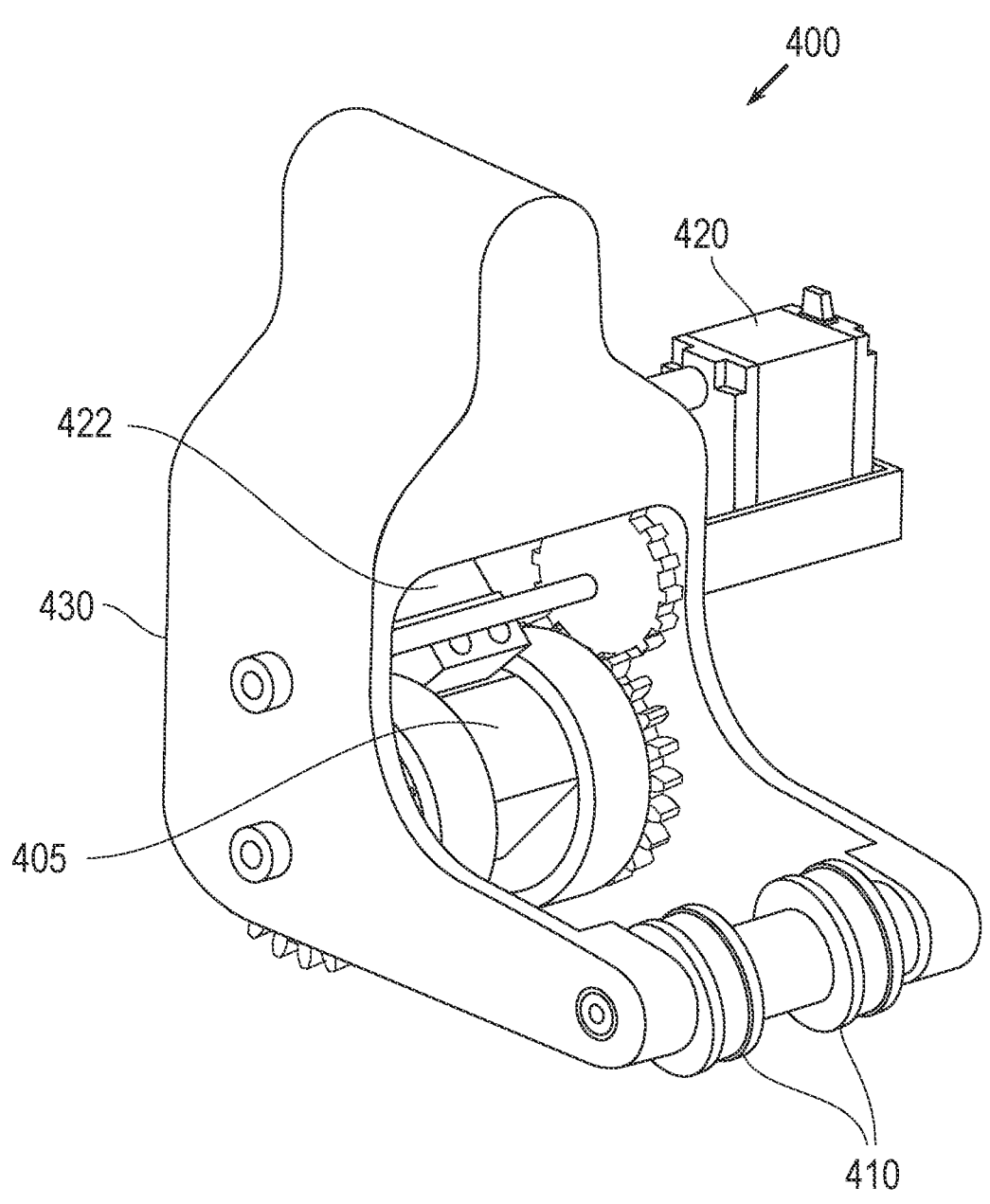
FIG. 8 is a perspective view of the crawling device.

FIGS. 7 and 8 illustrate the combination of the ultrasonic inspection device 100 with the crawling vehicle 400 to move the ultrasonic inspection device 100 along the pipe 10 or tub. This combination enables the scan of the entire pipe 10 or tube since it enables the lateral and circumferential movement of the ultrasonic inspection device 100. The illustrated crawling vehicle 400 features magnetic wheels 410 to be attached on ferromagnetic surfaces as described in more detail below.

The coupling between the crawling vehicle 400 and the ultrasonic inspection device 100 can be achieved using any number of traditional techniques, including detachable coupling mechanisms that fixedly attach the two to one another. The crawling vehicle 400 can be coupled to the ultrasonic inspection device 100 near the center of the half ring shaped housing 110.

The crawling vehicle 400 includes a large main wheel 405 with switchable magnetism to enable easy attachment and detachment of the vehicle 400 to the target surface (pipe 10), two front magnetic wheels 410 with a weak magnetism to balance and prevent the crawling vehicle 400 and ultrasonic inspection device 100 combination from tipping which is critical to preserve the cuff orientation. The crawling vehicle 400 also features two motors. A first motor 420 is considered to be a driving motor to drive the crawling vehicle 400 forward and backward and a second motor 422 is to turn and switch off the magnetism of the main wheel 405. Finally, the crawling vehicle 400 includes a chassis 430 that houses all the parts together.

The working principles of the crawling vehicle 400 are as follows: (1) the magnetism of the large switchable magnet is switched on by the action of the second motor 422 (switching motor); (2) the combined crawling vehicle 400 and the device 100 is moved to the pipe until all three of the magnetic wheels are engaged with the surface; and (3) the inspection process begins and can follow any of the scan paths described herein.

Figure 9A:
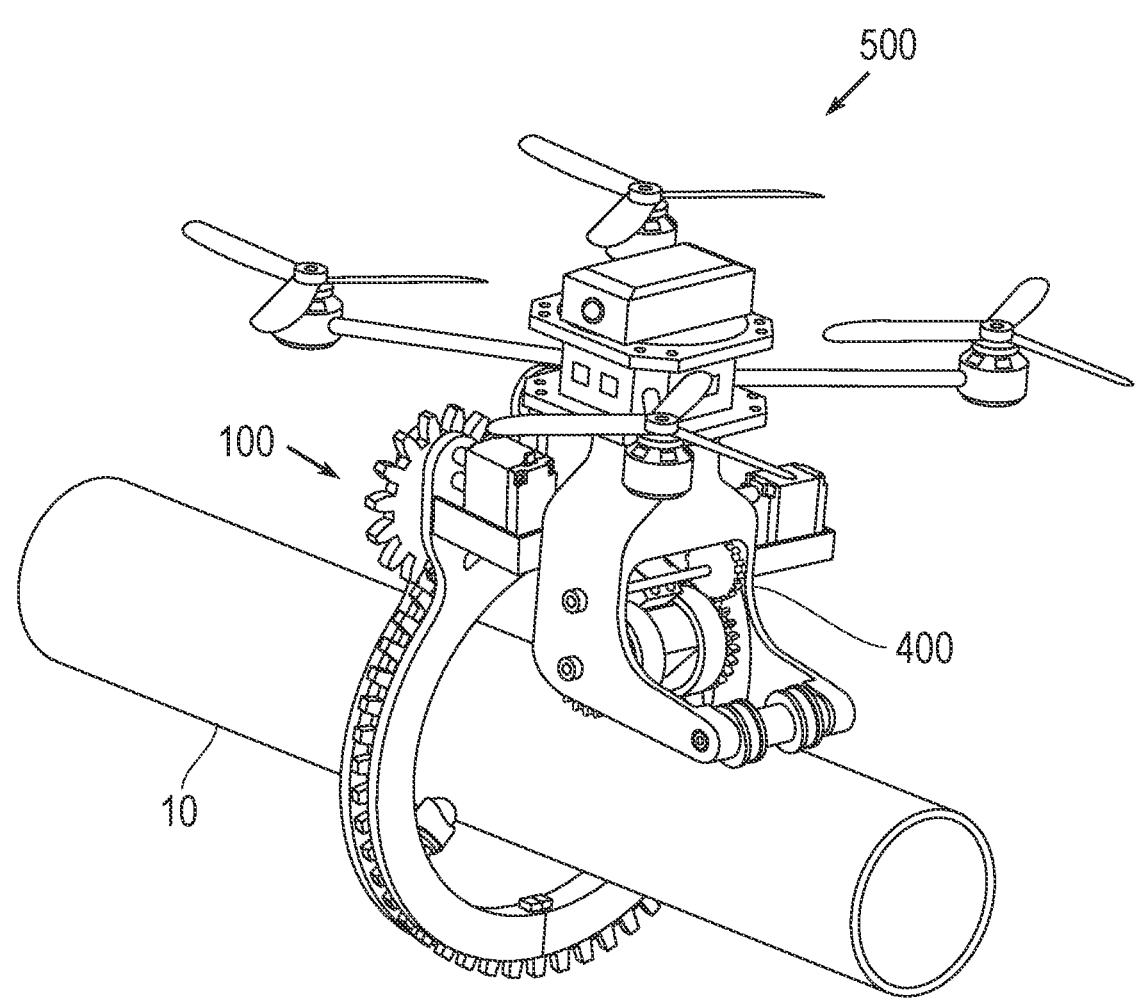
FIGS. 9A-9C are perspective and side views of the integration of the crawling device and ultrasonic inspection device with a drone.
Figure 9B:
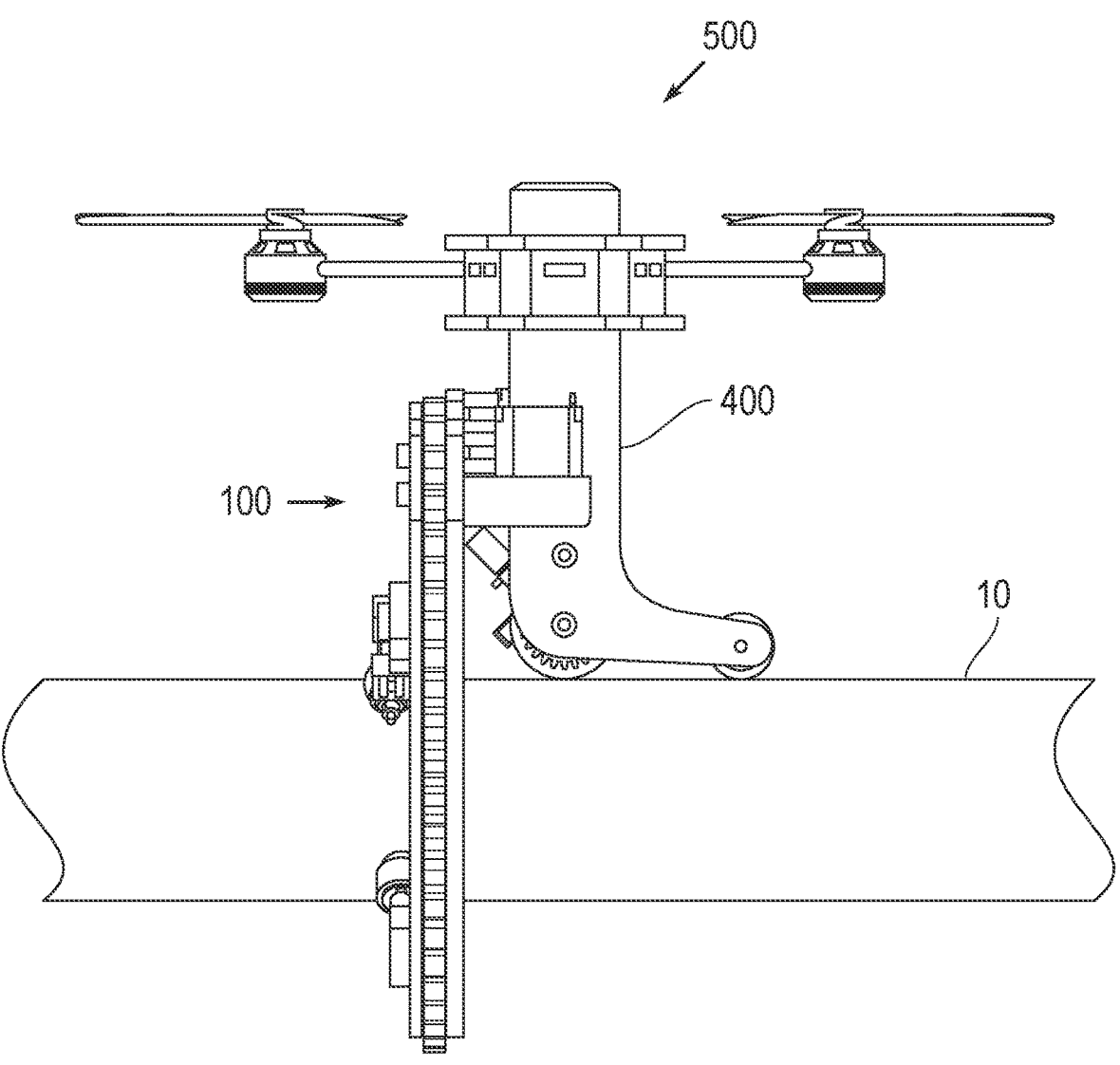
Figure 9C:
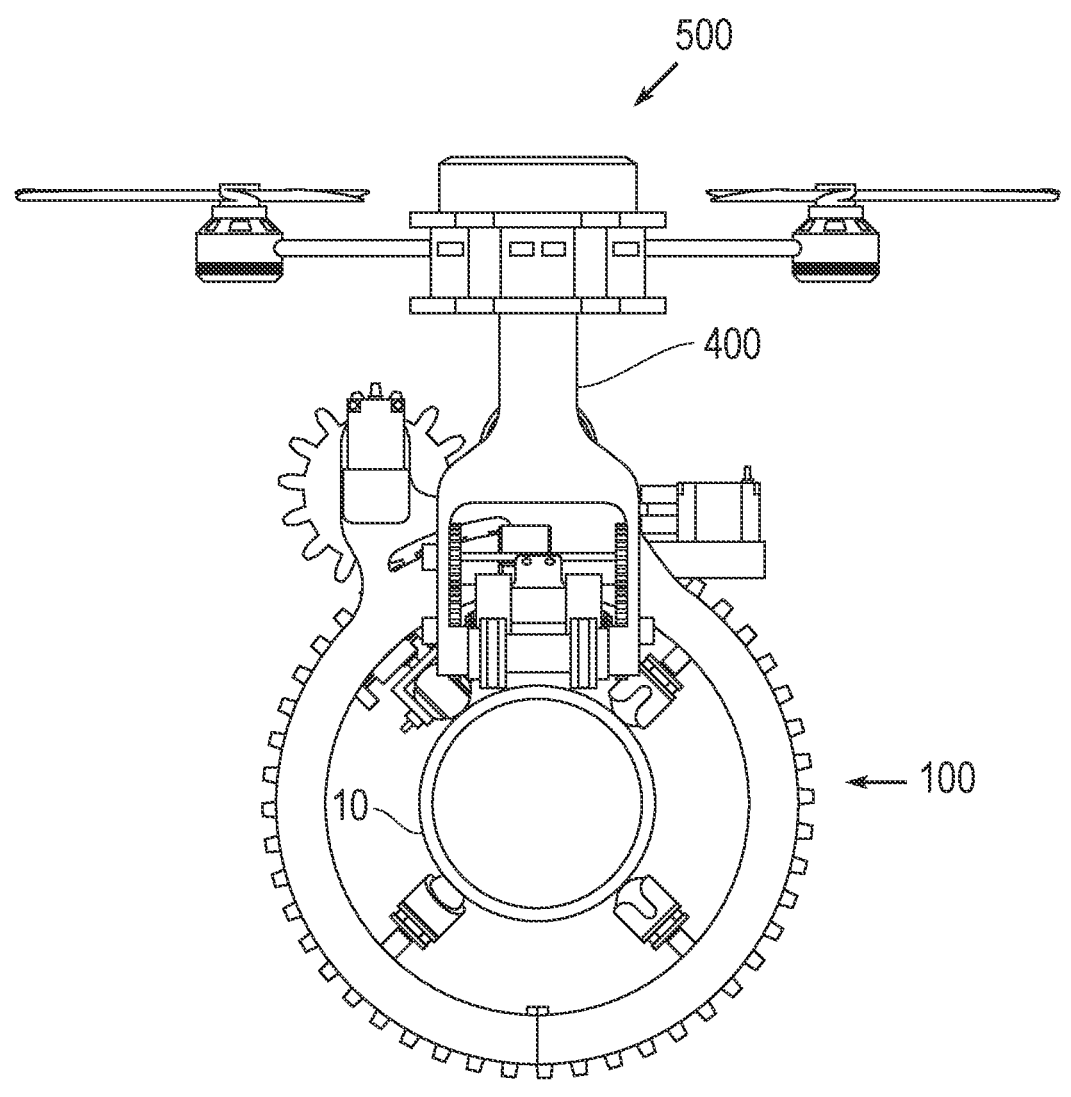

Now referring to FIGS. 9A-9C, the design of the crawling vehicle 400 can be integrated with a drone 500. More specifically, the drone 500 can be securely coupled to the crawling vehicle 400 which is itself securely coupled to the device 100 to permit delivery of the vehicle 400 and device 100 to the target pipe 10. The two front magnetic wheels 410 can be utilized to land the drone 500 on the ferromagnetic pipe 10 as well as for driving the drone 500, and the device 100, along the pipe 10. The two front magnetic wheels 410 will be utilized to land on ferromagnetic pipes 10 as well as driving the drone 500 combined with device (cuff) 100 along the pipe 10. Alternatively, once the drone 500 lands on a ferromagnetic pipe 10 using the wheels magnetism, the drone's propellers can be rotated 90 degrees to thrust the entire assembly forward along the pipe 10.

Ultrasonic Inspection Device with Spring-Loaded Linkage

Figure 10A:
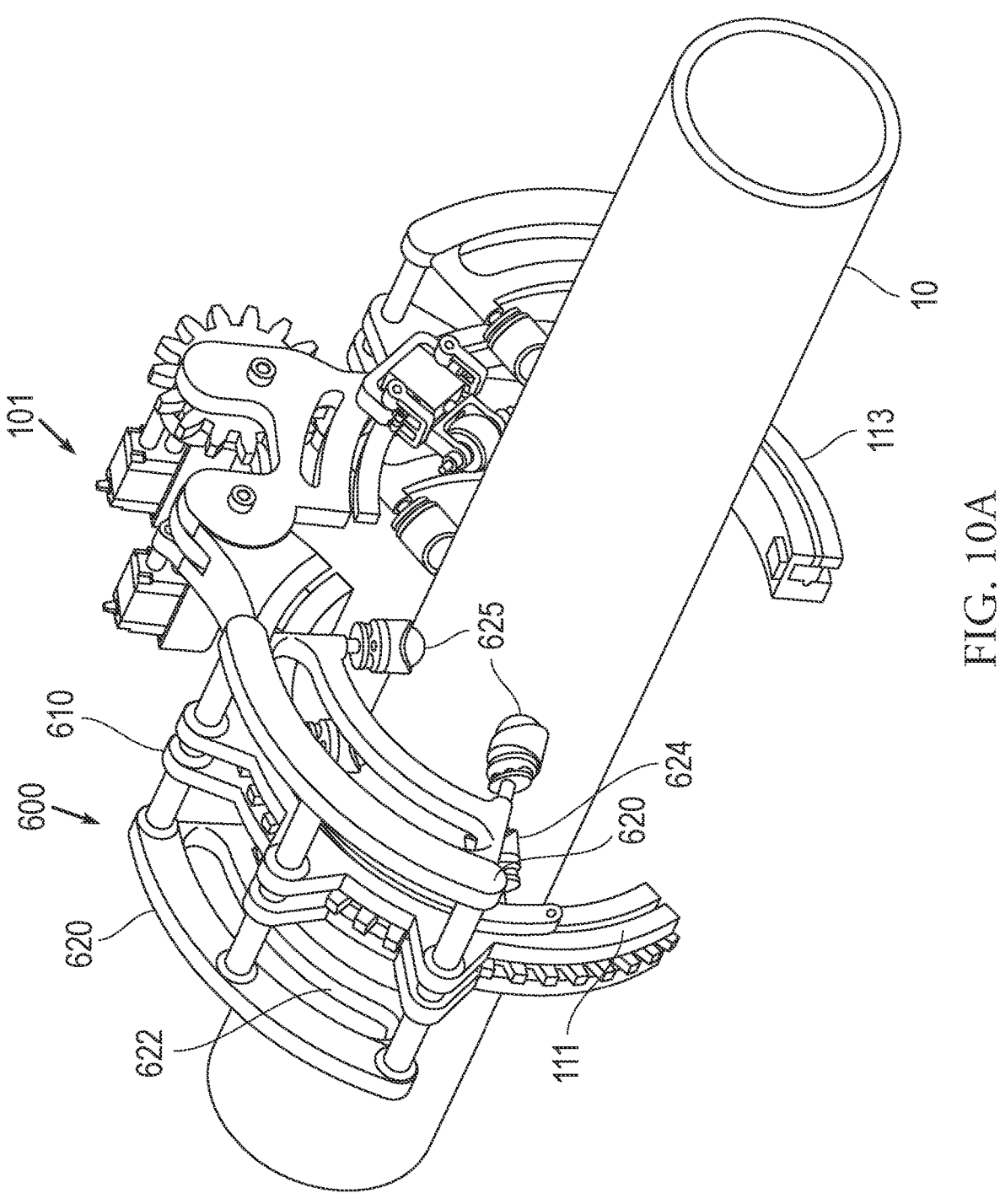
FIGS. 10A-10C are perspective and side views of another embodiment illustrating an ultrasonic inspection device for use with non-ferromagnetic pipes.
Figure 10B:
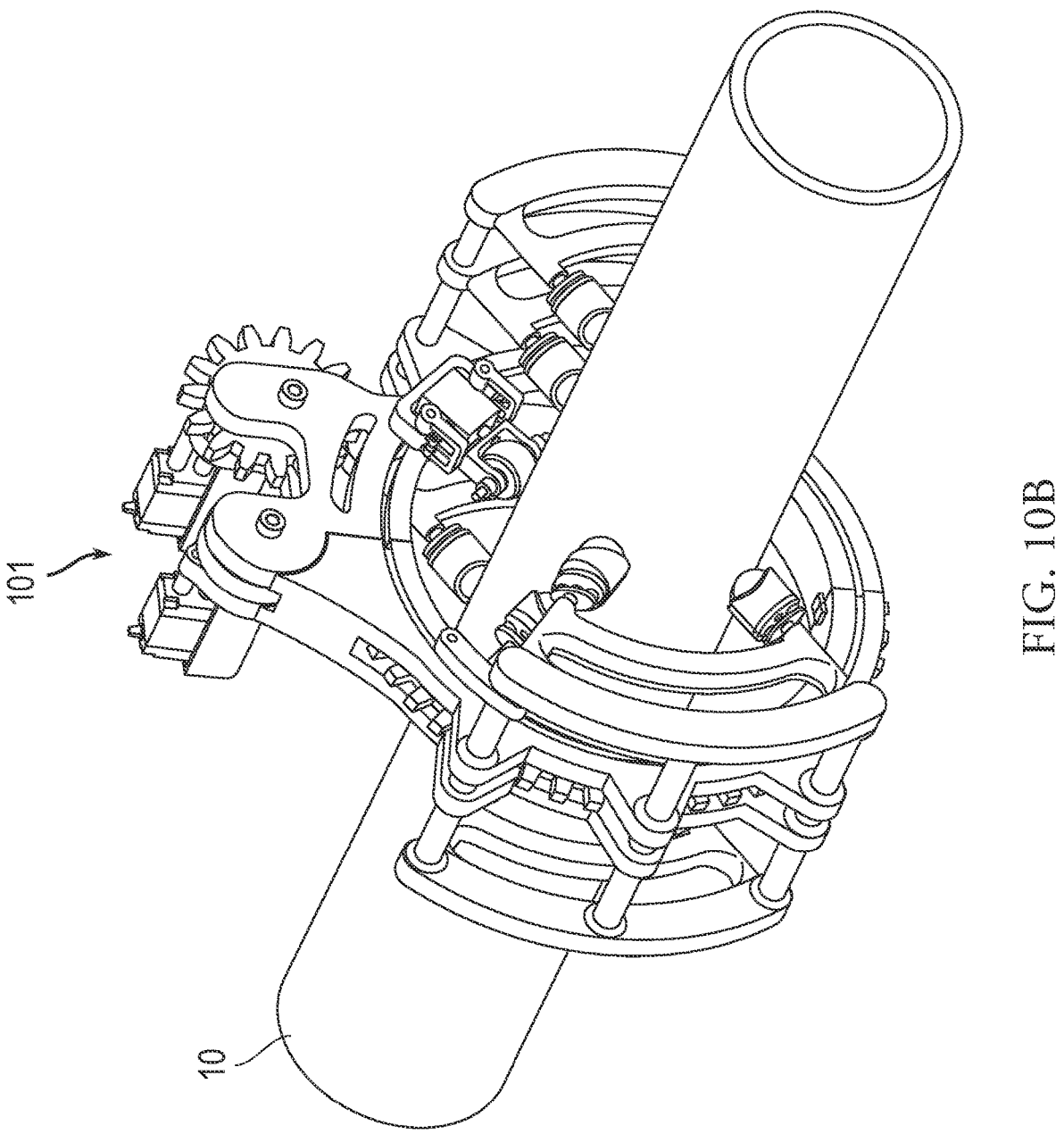
Figure 10C:
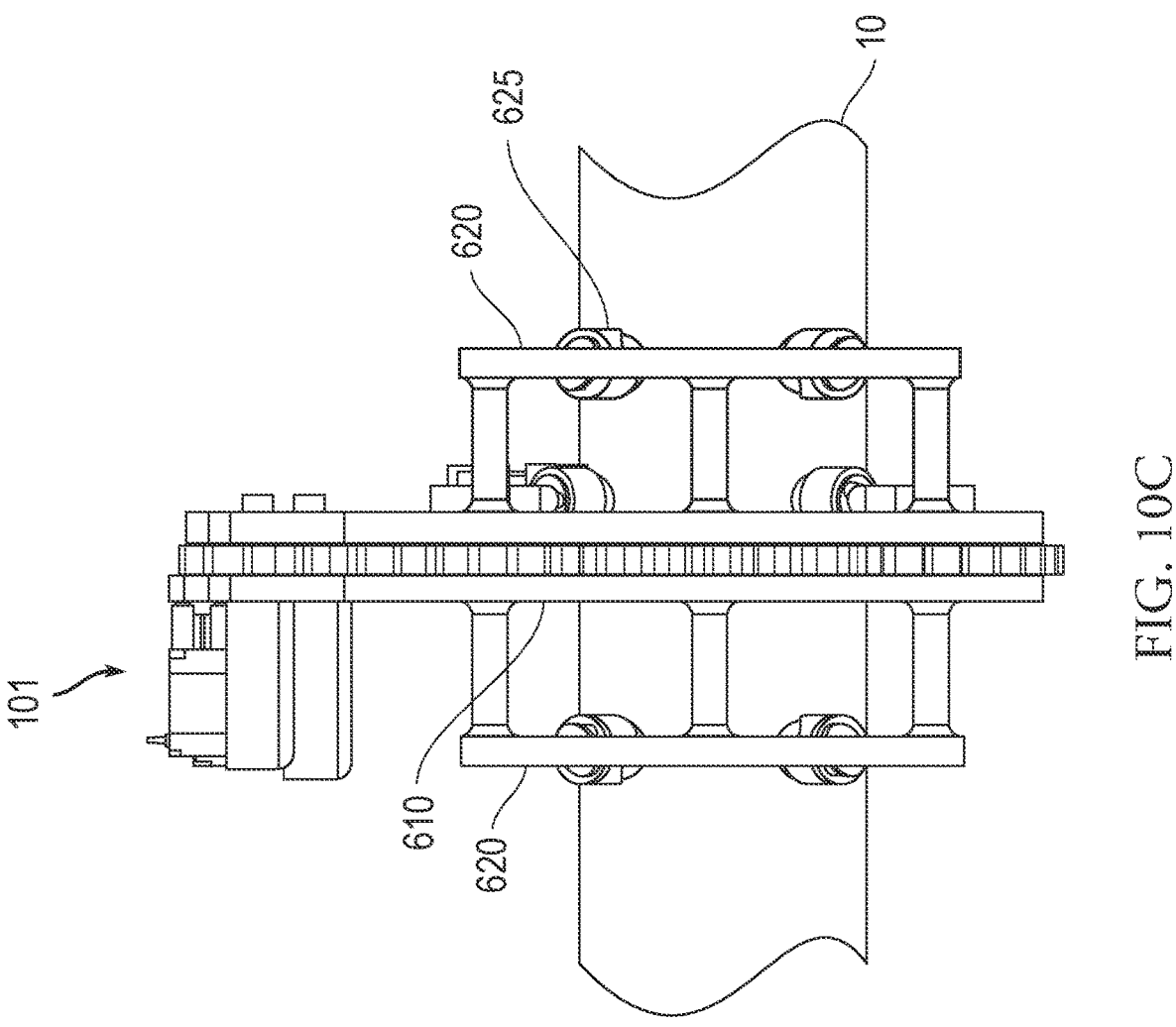

Now turning to FIGS. 10A-10C in which another embodiment is illustrated and more particularly, an ultrasonic inspection device (cuff) 101 is illustrated. The ultrasonic inspection device 101 is similar to the ultrasonic inspection device 100 and therefore, like elements are numbered alike.

As mentioned above, the prior embodiment and in particular, the crawling vehicle 400 used therein is intended for use with ferromagnetic pipes 10. However, non-ferromagnetic pipes 10 are available and require inspection and therefore, the embodiment of FIGS. 10A-10C is intended for use with a non-ferromagnetic pipes 10. In this case, magnetic force cannot be used to adhere the device (cuff) 101 to the surface of the non-ferromagnetic pipe 10. Instead, mechanical grip in the form of biasing elements is utilized.

More particularly, each of the arcuate shaped first and second housings 111, 113 including a spring frame 600 that is directly attached to the respective first or second housing 111, 113. The connection of the spring frame 600 to the first or second housing 111, 113 does not interfere with movement of the driven gear 200, 210 within the first or second housing 111, 113. As shown, the spring frame 600 can have a center section 610 that attaches to one of the first or second housings 111, 113 on either side of the track 122, 132 (FIG. 1) so that center section 610 does not interfere with the driving movement of the driven gear 200, 210. The spring frame 600 further includes a pair of side sections 620 that are spaced from the center section 610 of either side of the center section 610. As described herein, the side sections 620 include biasing elements, such as compression springs. The device (cuff) 100 already utilizes compression springs (as part of the UT probe 340 and caster ball assemblies 350) for alignment and to be able to scan pipes 10 with different diameter. These sets of springs should not be the only one to be utilized; since for proper adhesion on the pipe strong compression is required which will restrict the UT probe 340 and caster balls 360 rotational motion as well as damaging them. Moreover, these springs will not be enough to prevent the device (cuff) 101 from tipping to the side. Consequently, additional springs are required to address these issues. The modified device shown in FIGS. 10A-10C illustrate a solution to these issues and allow the device (cuff) 101 to be maintained in the desired orientation about the pipe 10.

Each side section 620 includes a linkage 622 with a plurality of posts 624 extending radially inward from the linkage 622. For example, the linkage 622 can have two posts 624 each of which has a compression spring loaded caster ball 625. Each caster ball 625 is positioned to seat against the pipe 10. In one embodiment, the compression springs used with the caster balls 625 can be of different types. In particular, the bottom compression springs can be stiffer than the top ones for proper centering of the pipe 10 within the device (cuff) 101. The addition of the compression spring loaded caster balls 625 thus provides additional grip on the pipe 10.

Figure 11:
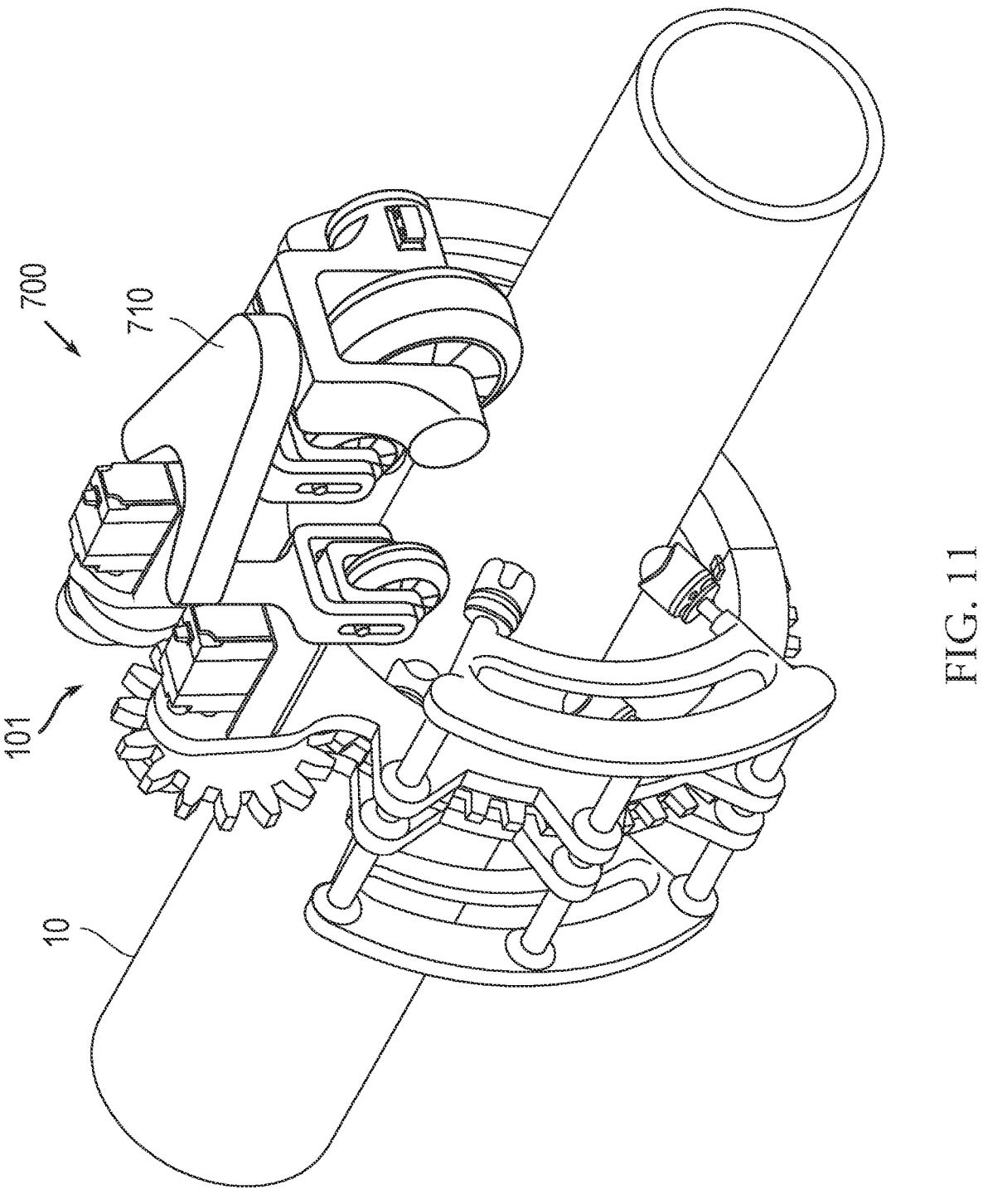
FIG. 11 is a perspective view of the ultrasonic inspection device of FIGS. 10A-10C in combination with a crawling vehicle.
Figure 12:
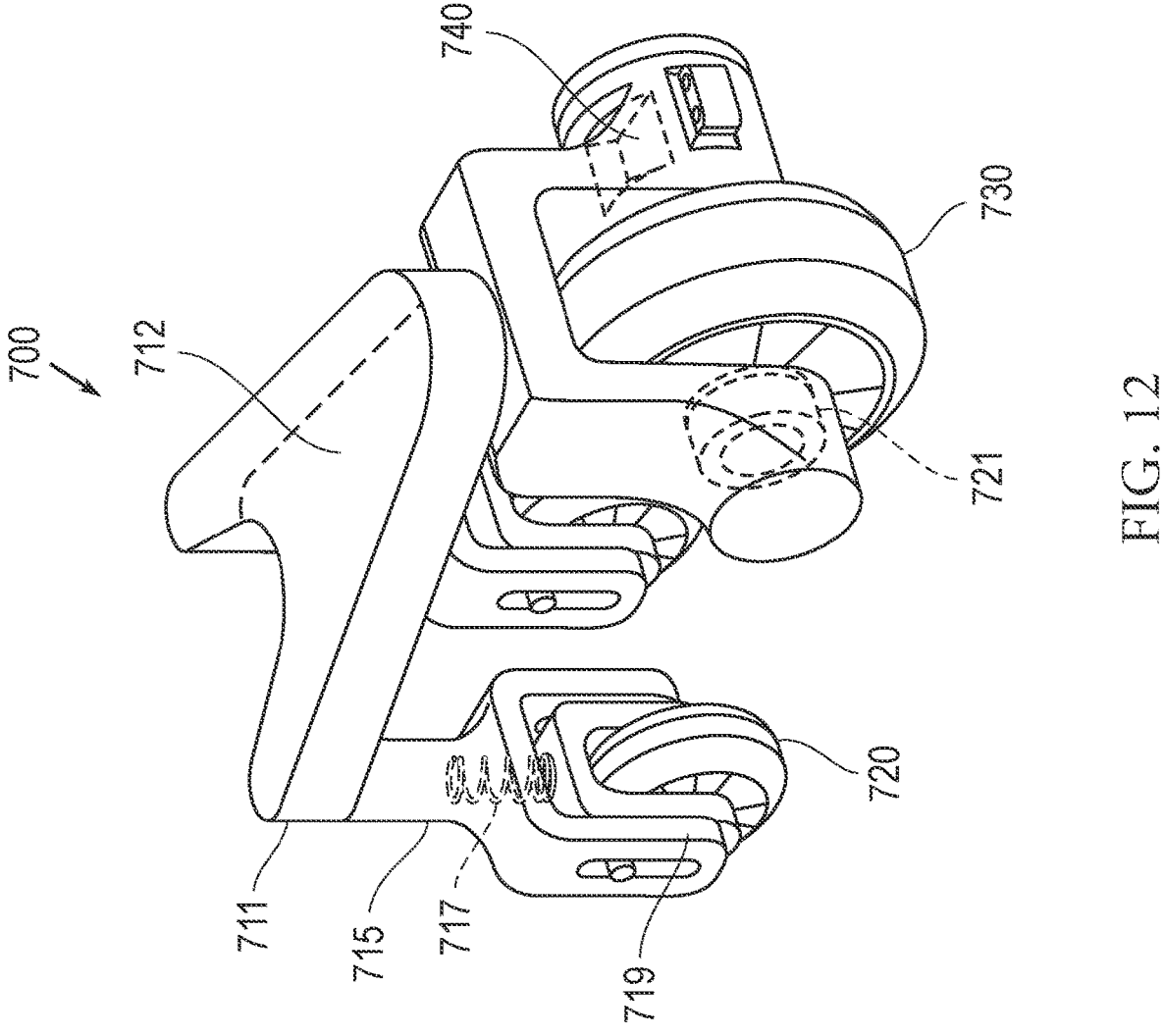
FIG. 12 is a perspective view of the crawling device.

Unlike the crawling vehicle 400 which is held to the pipe 10 using magnetic attraction and provides the driving force of the device (cuff) 100, the ultrasonic inspection device 101 is intended for use with and engagement with a non-ferromagnetic pipe 10. The ultrasonic inspection device 101 can be driven manually by pushing or pulling it. Alternatively, the device 101 can be coupled to a motorized driving vehicle 700 that is shown in FIGS. 11 and 12. In particular, the driving vehicle 700 has a chassis 710 that includes an inner compartment 712. As shown, the chassis 710 is configured to engage and mate to the device 101. The chassis 710 can have a tricycle design in that there are a pair of rear wheels 720 and a single front wheel 730. The pair of rear wheels 720 are coupled to a pair of rear hollow posts 715 that extend downwardly. Within the hollow posts 715 are a pair of springs 717 that apply biasing forces to a pair of rear wheel adaptors 719 to which the pair of rear wheels 720 are coupled. The compression spring loading of the pair of rear wheels 720 applies additional gripping force to the pipe 10 to hold the device 101 in place.

The single front wheel 730 comprises a driven wheel in that a driving motor 740 is provided and is operatively coupled to the single front wheel 730 to provide controlled rotation thereto. The driving motor 740 can be a servo motor that is battery powered.

A bearing 721 is also provided.

The device 101 and driving vehicle 700 can be integrated with drones' systems in several ways:

1. A drone (such as drone 500) can carry the mechanism coupled with a wheel in its front. The cuff 101 and its auxiliary component will open when the drone is near the pipe 10 and will close when the pipe 10 is in the middle of the cuff 101. The drone can disengage from it until the inspection process is done. Once it is done, the drone 500 can engage with cuff 101 and the cuff 101 should be opened for the drone 500 to be able to fly away.
2. A drone could be coupled with this mechanism through flexible rope or chain. First, the drone will descend with cuff open until the cuff can close on. Following the cuff closing, the drone can fly in angled orientation causing the cuff to slide along the pipe for the inspection.
3. A drone with propellers orientation adjustment mechanism could be coupled with the cuffing mechanism. In a similar starting fashion, the drone with its propellers facing the vertical direction will fly first to the intended pipe for inspection. Following this step, the cuff will close on the pipe. Then, the propellers will be rotated to face the horizontal direction which will be utilized to move the cuff along the pipe.

Eddy Current Array

In this embodiment, Eddy Current Array technique is selected to conduct the metal thickness evaluation with the capability of providing a complete C scan to the pipe. EDA is a nondestructive testing method that drives multiple eddy current coils in an array around the pipe circumference. each coil produces a signal relative to the nearest pipe segment. The produced signals from the coils then get collected and processed simultaneously to provide complete circumference reading of the pipe thickness.

Figure 13:
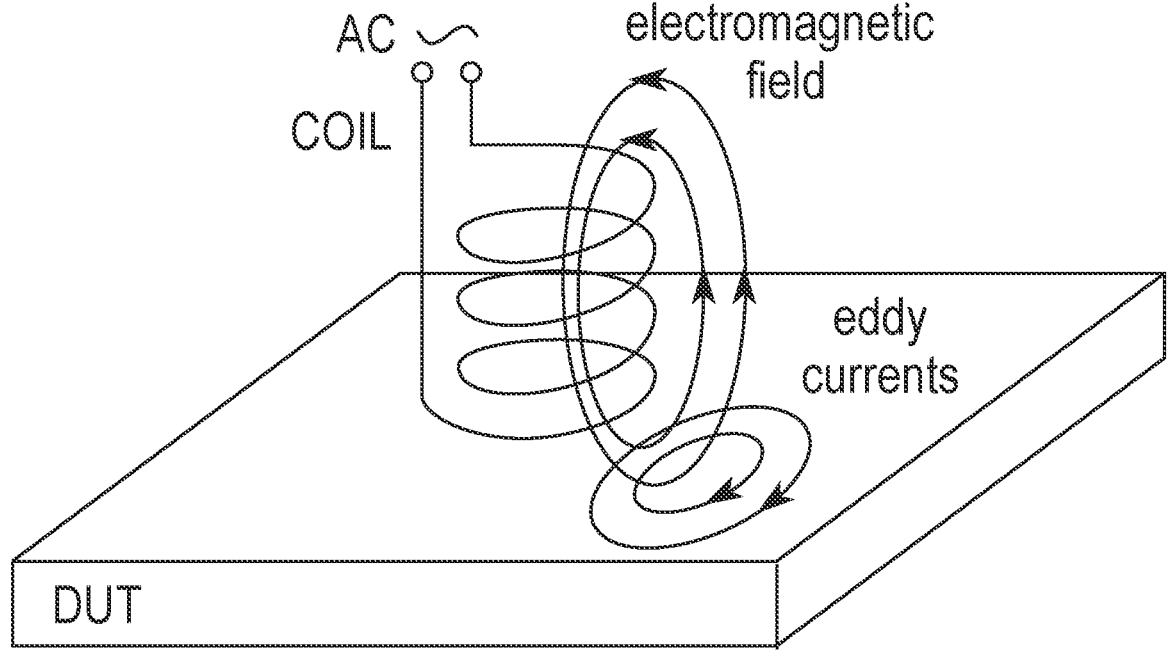
FIG. 13 illustrates the principles of eddy current.
Figure 14A:
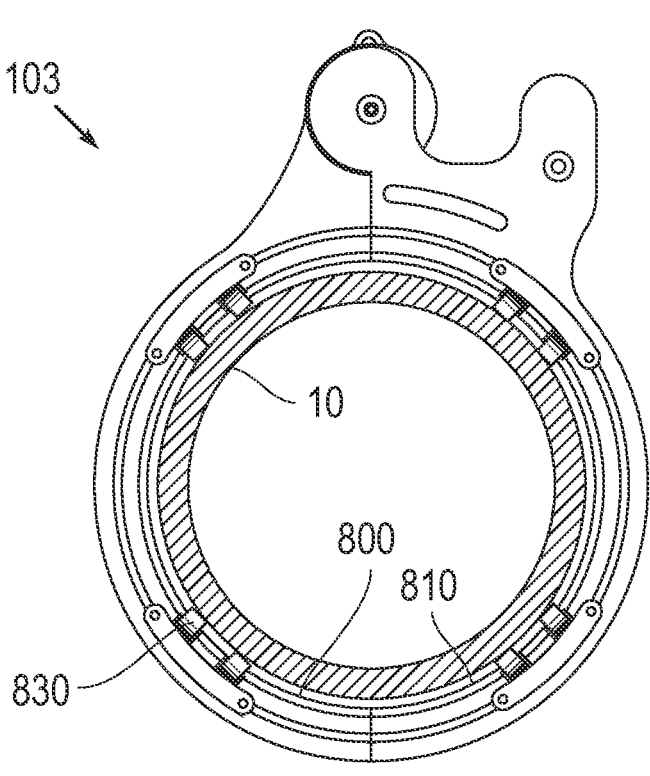
FIGS. 14A and 14B are side views of another embodiment illustrating an ultrasonic inspection device with eddy current array sensors.
Figure 14B:
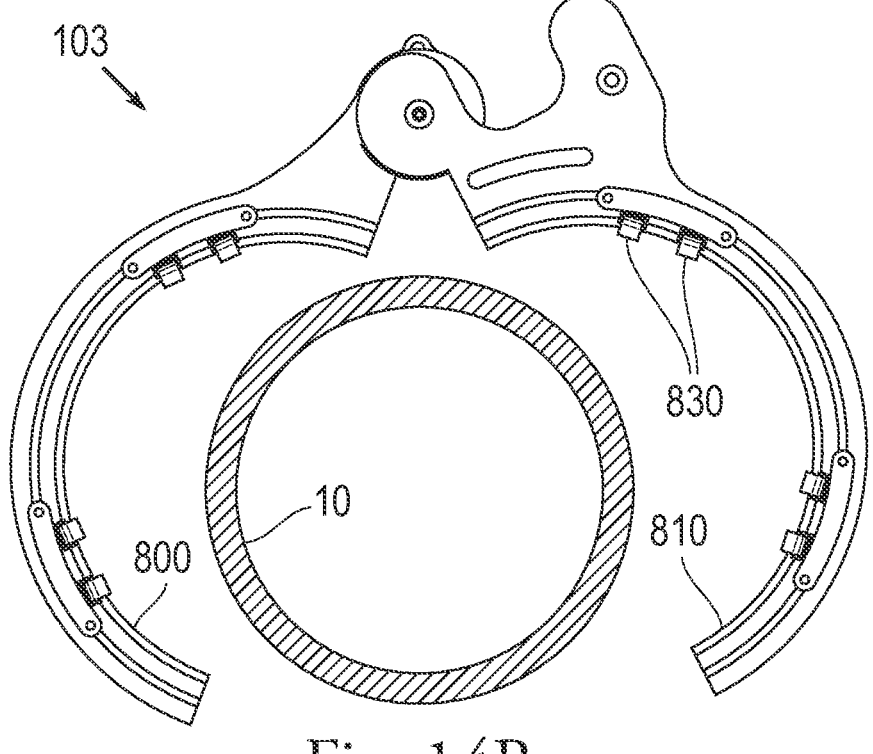

FIG. 13 illustrates the principle of eddy current. The coil here represents one coil cell, whereas the ECA technique combines an array of these coils in any desirable pattern. In FIGS. 14A and 14B, an ultrasonic inspection device 103 is provided and shares similarities with the devices 100, 101 and therefore like elements are numbered alike. This embodiment utilizes the same cuff mechanism principle of device 100 and shown in prior figures, but instead of using a UT probe 340 (FIG. 1) to measure the pipe wall thickness, an eddy current array (ECA) flexible film is used (e.g., two film segments can be used as described below).

Thus, as shown, within the tracks 122, 132, there are no driven gears 200, 210 but instead there is a first eddy current array (ECA) 800 (first ECA sensor(s)) and a second eddy current array (ECA) 810 (second ECA sensor(s)). The first ECA (sensor) 800 is disposed within the first track 122 and the second ECA (sensor) 810 is disposed within the second track 132. Thus, the first ECA 800 is associated with the arcuate shaped first housing 111 and the second ECA 810 is associated with the arcuate shaped second housing 113. Unlike the previous embodiment, these two sensor arrays 800, 810 are fixed and do not move relative to the arcuate shaped first and second housings 111, 113.

Figure 15:
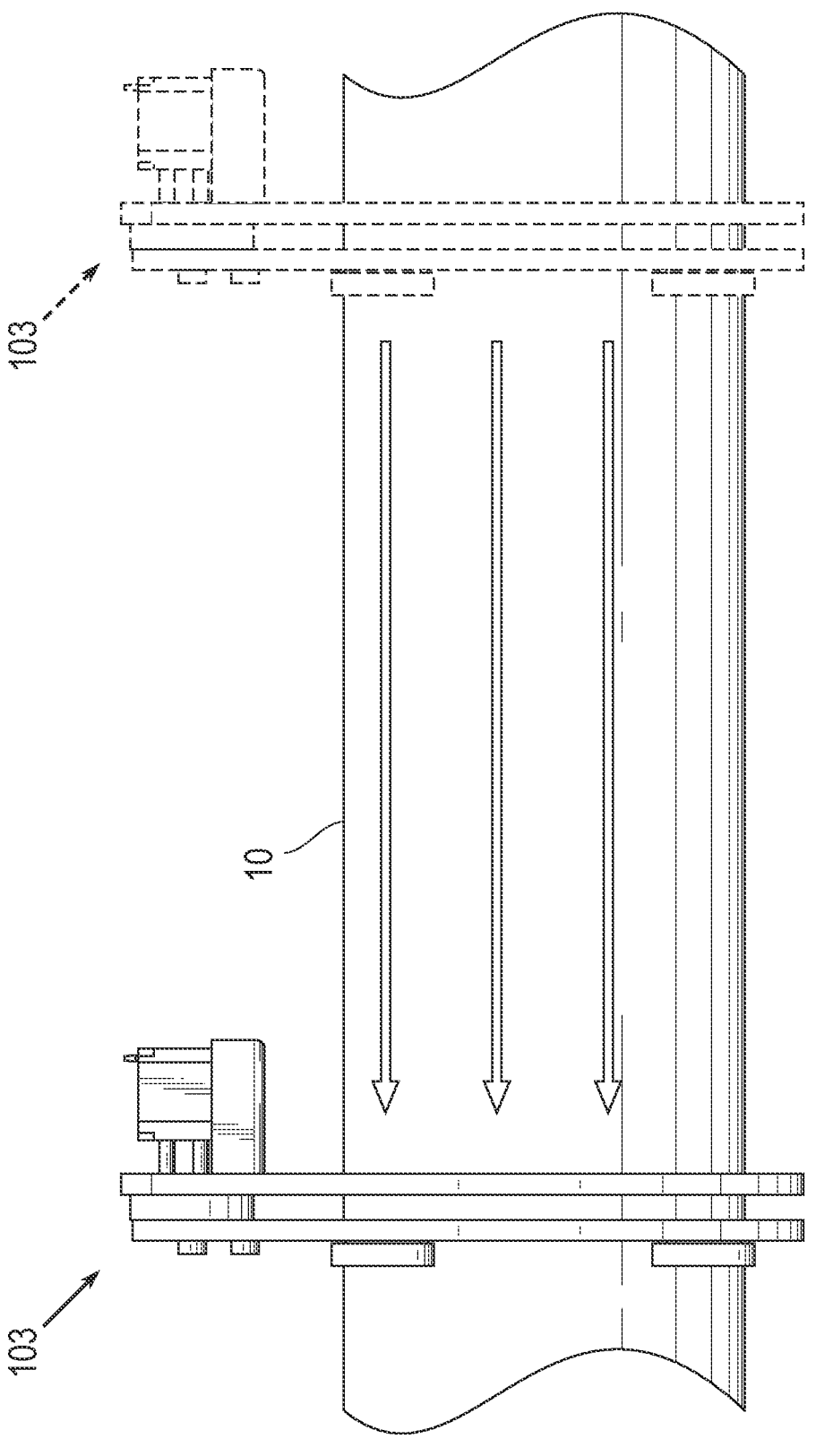
FIG. 15 shows the transition of the ultrasonic inspection device of FIG. 14A on the pipe resulting in scanning the covered segment and mapping any possible defects.

The cuff mechanism in this embodiment depends on sliding rollers 830 instead of the spring-loaded caster balls 360 (FIG. 1) to slide the device (cuff) 103 along the pipe 10. However, in terms of actuating the device (cuff) 103, only the first motor 160 is used to open and close the device (cuff) 103 as shown in FIGS. 14A and 14B. The device (cuff) 103 in this embodiment can be driven by the crawling vehicle 400 or the drone 500. It can also be dragged manually against the inspected pipe 10. FIGS. 14A-B and FIG. 15 illustrate the cuff design and functionality. Each of the first driven gear 200 and the second driven gear 210 can include two pairs of sliding rollers 830. Each of sliding rollers 830 is connected directly to the respective driven gear as by fasteners that pass through the slot 125, 135.

The eddy current array method provides an advantage to conduct a full c scan when you compare it with other thickness measurement methods described herein. Integrating the ECA sensor into the cuff mechanism will allow the user to conduct a faster inspection covering the entire circumference of the pipe 10. For example, FIG. 15 shows the transition of the device (cuff) 100 on the pipe 10 resulting in scanning the covered segment and mapping any possible defects.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An ultrasonic inspection device for a pipe or tube comprising:

an arcuate shaped first housing having an arcuate shaped first guide track, the arcuate shaped first housing having a first end and an opposite second end spaced from the first end;

an arcuate shaped second housing having an arcuate shaped second guide track, the arcuate shaped second housing having a first end and an opposite second end spaced from the first end, wherein the arcuate shaped first and second housings are pivotally coupled to one another to allow the ultrasonic inspection device to move between an open position in which the second ends of the arcuate shaped first and second housings are spaced apart for receiving the pipe or tube and a closed position in which the second ends of arcuate shaped first and second housings are joined;

a driving gear assembly coupled to the arcuate shaped second housing, the driving gear assembly including a driving gear powered by a gear driving motor, the driving gear rotating about a fixed axis;

arcuate shaped first and second driven gears that travel within the arcuate shaped first and second guide tracks, formed within the arcuate shaped first and second housings, when the ultrasonic inspection device is in the closed position to permit the arcuate shaped first and second driven gears to be driven in a 360 degree path around the pipe or tube, the arcuate shaped first and second guide tracks being open along an outer edge of the arcuate shaped first and second housings; and an ultrasonic testing (UT) probe assembly fixedly attached to the arcuate shaped second driven gear and configured for direct contact with the pipe or tube for performing ultrasonic inspection of the pipe or tube, wherein the UT probe assembly passes through one of the arcuate shaped first and second housings depending on the location of the arcuate shaped second driven gear.

2. The ultrasonic inspection device of claim 1, wherein each of the arcuate shaped first housing and the arcuate shaped second housing and each of the arcuate shaped first guide track and the arcuate shaped second guide track has a C-shape.

3. The ultrasonic inspection device of claim 1, wherein an arcuate length of each of the arcuate shaped first and second housings is 180 degrees.

4. The ultrasonic inspection device of claim 1, wherein first and second ends of the arcuate shaped first and second guide tracks are open and the driving gear is disposed radially outward of the first and second driven gears and wherein each of the arcuate shaped first and second housings includes a guide slot through which the UT probe assembly passes.

5. The ultrasonic inspection device of claim 1, wherein each of the arcuate shaped first and second driven gears has a C-shape with outwardly protruding teeth and the driving gear comprises a circular toothed gear.

6. The ultrasonic inspection device of claim 1, further including a first motor that is coupled to the arcuate shaped second housing and is coupled to the arcuate shaped first housing by a first drive shaft such that operation of the first motor pivots the arcuate shaped first housing between open and closed positions.

7. The ultrasonic inspection device of claim 6, wherein the first end of the arcuate shaped first housing includes a first coupler that engages a second coupler at the first end of the arcuate shaped second housing in a pivoting manner, the first coupler comprising a circular shaped structure that rotates within the second coupler and the first drive shaft is fixedly coupled to the arcuate shaped first housing to cause rotation thereof.

8. The ultrasonic inspection device of claim 6, wherein the gear driving motor is coupled to the arcuate shaped second housing and offset from the first end of the arcuate shaped second housing.

9. The ultrasonic inspection device of claim 1, wherein the second end of the arcuate shaped first housing has a first magnet and the second end of the arcuate shaped second housing has a second magnet that is magnetically attracted to the first magnet for joining the arcuate shaped first and second housings in the closed position.

10. The ultrasonic inspection device of claim 1, wherein the ultrasonic testing (UT) probe assembly is fixedly attached to the arcuate shaped second driven gear by a holder and the ultrasonic testing (UT) probe assembly includes a spring biased motor that is coupled to a pair of guiders that move within guide slots formed in the holder, the spring biased motor being operatively coupled to a rotatable UT probe that is coupled to a UT probe coupler that is coupled to a drive shaft of the spring biased motor.

11. The ultrasonic inspection device of claim 1, further including a plurality of caster ball assemblies that are coupled to the arcuate shaped first and second driven gears, each caster ball assembly including a spring biased caster ball for contacting the pipe or tube.

12. The ultrasonic inspection device of claim 11, wherein the arcuate shaped first driven gear has two caster ball assemblies and the arcuate shaped second driven gear has one caster ball assembly spaced from the ultrasonic testing (UT) probe assembly.

13. The ultrasonic inspection device of claim 1, further including a crawling vehicle that is coupled to the arcuate shaped second housing for controllably moving the ultrasonic inspection device along the pipe or tube.

14. The ultrasonic inspection device of claim 13, wherein the crawling vehicle includes a pair of magnetic wheels and a main wheel with switchable magnetism and a driving motor that causes movement of the crawling vehicle.

15. The ultrasonic inspection device of claim 13, further including a drone that is configured to dock with the crawling vehicle to transport and deliver the crawling vehicle and the ultrasonic inspection device to the pipe or tube.

16. The ultrasonic inspection device of claim 1, wherein a first spring frame is coupled to the arcuate shaped first housing and a second spring frame is coupled to the arcuate shaped second housing, each of the first spring frame and the second spring frame has a center section attached to the respective arcuate shaped first and second housings and a pair of side sections spaced from and on either side of the center section, wherein each side section supports a plurality of spring biased caster ball assemblies including caster balls for contacting the pipe or tube.

17. The ultrasonic inspection device of claim 16, wherein each side section has a linkage with a plurality of posts depending inwardly therefrom, the plurality of posts supporting the spring biased caster ball assemblies.

18. An ultrasonic inspection device for a pipe or tube comprising:

an arcuate shaped first housing having an arcuate shaped first guide track, the arcuate shaped first housing having a first end and an opposite second end spaced from the first end;

an arcuate shaped second housing having an arcuate shaped second guide track, the arcuate shaped second housing having a first end and an opposite second end spaced from the first end, wherein the arcuate shaped first and second housings are pivotally coupled to one another that allows the ultrasonic inspection device to move between an open position in which the second ends of the arcuate shaped first and second housings are spaced apart and a closed position in which the second ends of arcuate shaped first and second housings are joined, wherein the arcuate shaped second housing having an upper leg with a pivot axis, about which the arcuate shaped first and second housings pivot, the pivot axis passing through the upper leg, a motor being disposed behind the upper leg for moving the arcuate shaped first and second housing between the open and closed positions;

a first motor that is coupled to the arcuate shaped second housing and is coupled to the arcuate shaped first housing by a first drive shaft such that operation of the first motor pivots the arcuate shaped first housing between open and closed positions;

an arcuate shaped first eddy current array (ECA) disposed within the first guide track; and an arcuate shaped second eddy current array (ECA) disposed within the second guide track;

wherein the arcuate shaped first and second eddy current arrays are configured to measure a wall thickness of the pipe or tube when the ultrasonic inspection device is in the closed position.

19. The ultrasonic inspection device of claim 18, further including a plurality of sliding roller assemblies that are coupled to the arcuate shaped first and second housings and extend radially inward for contacting the pipe or tube.

20. The ultrasonic inspection device of claim 18, wherein the second end of the arcuate shaped first housing has a first magnet and the second end of the arcuate shaped second housing has a second magnet that is magnetically attracted to the first magnet for joining the arcuate shaped first and second housings in the closed position.

* * * * *